Figure 1:
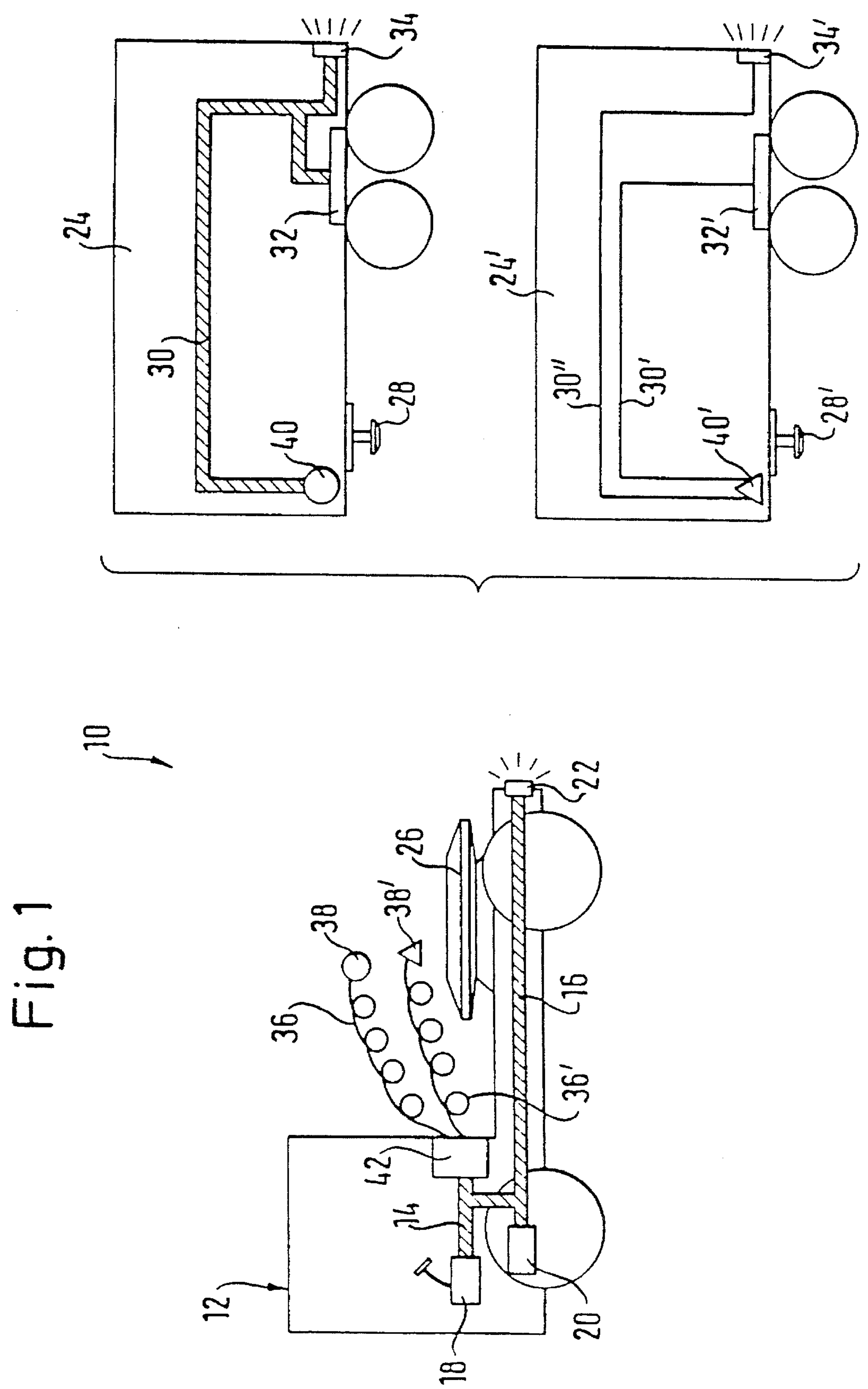

US005458357A

United States Patent [19]

Wohlhüter

[11] Patent Number: 5,458,357

[45] Date of Patent: Oct. 17, 1995

[54] MOTOR VEHICLE ASSEMBLY, IN PARTICULAR SEMITRAILER

[75] Inventor: Gerhard Wohlhüter, München, Germany

[73] Assignee: Rockinger Spezialfabrik fur Anhangerkupplungen GmbH & Co., Munich, Germany

[21] Appl. No.: 160,083

[22] Filed: Nov. 24, 1993

Related U.S. Application Data

[63] Continuation-in-part of Ser. No. 967,690, Oct. 27, 1992, abandoned.

[30] Foreign Application Priority Data

Oct. 30, 1991 [DE] Germany .......................... 41 35 795.7
Oct. 20, 1993 [DE] Germany .......................... 9316011 U

[51] Int. Cl.$^{6}$ .......................... B60D 1/64
[52] U.S. Cl. .......................... 280/420
[58] Field of Search .......................... 280/420, 421, 280/422

[56] References Cited

U.S. PATENT DOCUMENTS

| | | | |
|---|---|---|---|
| 2,457,478 | 12/1948 | Letvin | 280/33.05 |
| 2,480,413 | 8/1949 | Kirksey | 280/33.05 |
| 2,513,651 | 7/1950 | Kirksey | 280/33.05 |
| 3,391,950 | 7/1968 | Carter et al. | 280/421 |
| 3,628,811 | 12/1971 | Rivers | 280/421 |
| 3,888,513 | 6/1975 | Pilz et al. | 280/421 |
| 4,577,885 | 3/1986 | Breu | 280/508 |
| 4,624,472 | 11/1986 | Stuart et al. | 280/420 |
| 4,738,463 | 4/1988 | Poore et al. | 280/420 |
| 4,943,079 | 7/1990 | Harbold | 280/420 |
| 5,044,653 | 9/1991 | Savanella | 280/421 |

FOREIGN PATENT DOCUMENTS

| | | | |
|---|---|---|---|
| 2641502 | 7/1990 | France | 280/420 |
| 1095132 | 12/1960 | Germany . | |
| 1455466 | 12/1968 | Germany . | |
| 2039310 | 2/1971 | Germany . | |
| 2900866 | 7/1980 | Germany . | |
| 3726822 | 12/1988 | Germany | 280/420 |
| 55-145012 | 11/1980 | Japan . | |
| 7801829 | 9/1979 | Sweden | 280/420 |
| 2204844 | 5/1991 | United Kingdom . | |
| 2209507 | 9/1991 | United Kingdom . | |

OTHER PUBLICATIONS

P. F114, Stäubli, brochure "Fight d'Application Manu".

Stäubli brochure, "Multikupplungen RMI für Automatisierung von Kunststoffspritzgiess–und Druckussmaschinen", Prospekt L100.01d, published Apr. 1990.

*Primary Examiner*—Kevin T. Hurley
*Attorney, Agent, or Firm*—Brumbaugh, Graves, Donohue & Raymond

[57] ABSTRACT

A motor vehicle assembly, in particular a semi-trailer truck, with two partial vehicles and a plurality of supply lines between the two partial vehicles is proposed, where each of the supply lines has a line coupling with a line coupling half on the tractor side and a line coupling with a line coupling half on the trailer side. In the motor vehicle assembly, a power device having an engagement element for the two line coupling halves is allocated to the line coupling halves of at least one line coupling, where the engagement elements are to be brought into mutual force transfer engagement after the line coupling halves have been brought into a preparatory coupling position and at least one of these engagement elements is adjustable in respect to the associated line coupling half, so that after making the force transfer engagement along with the subsequent displacement of the at least one engagement element in respect to the associated line coupling half, there is a forced relative movement between the two line coupling halves in a coupling direction in the sense of bringing these two line coupling halves into a coupled state.

37 Claims, 18 Drawing Sheets

68a 66 68b 70a1 72a1 72b1 70b1 70a2 70b2 92 72a2 74 72b2 92a 92c VII VII 84c 84 72a3 42' 72b3 70b3 70a3 46 48 50 70a4 70b4

10
12
14
16
18
20
22
24
24'
26
28
28'
30
30'
30"
32
32'
34
34'
36
36'
38
38'
40
40'
42

34
34c
34'b
34b
34''
34a
34'a
30
30''
48
50a
50b
50c
52a
52b
52c
52a1
52b1
52c1
57
56
54
42
46
16
18b
18a
18

132
132a
132b
132c
134
134a
134b
134c
130
148
142
154
150a
150b
150c
160a
160b
160c
152a
152a1
152b
152b1
152c
152c1
157
156a
156b
156c
158a
158b
158c
162
164
118'

74
74b1
76
74b3
68b
78
74b
74b4
74b2
80a
82e
90
68a
84b
82b
82d
82c
84a
82a
A
82
86
74a
84
80
88
92
92b
B
92a
94

74b
76
80a
68b
90
78
74
82e
74b4
68a
82b
82d
82a
82
86
74a
80
84
88
92b
94
92
92a 74
74b
68b
76
80a
82e
90
74b4
68a
82a
82d
86
82
74a
84
80
88
92
94

24
472b2
472b3
470b1
475b1
475b2
475b3
496
468b
472b1
473b1
473b2
473b3
496a
468
470b2
470b4
470b3
468a
472a1
472a2
472a3
470a4
470a3
470a1
470a2
471a1
471a2
471a3
498
469a1
469a2
469a3
12
467

24
12
568
568a
568b
596
596a
598
567
570b1
572b3
570b2
572b1
572b2
570b3
570b4
575b1
575b2
575b3
577b1
577b2
577b3
572a1
572a2
572a3
565a1
565a2
565a3
570a1
570a2
570a3
570a4
569a1
569a2
569a3

24
T
670b1
672b3
670b2
674b
677b1
677b2
677b3
675b3
675b1
675b2
$G_{12}$
$G_{22}$
696
668b
672b1
672b2
670b3
670b4
696b
696a
668
674a
663
$G_{21}$
668a
672a1
672a2
672a3
674
H
670a3
670a4
670a1
670a2
698
698a
R'
698b
12
669a1
669a2
669a3
$G_{11}$
K
667

74
74b
74b1
74b2
74b3
74b4
74b5
74b6
74b7
74b8
59
76
78
68b
68a
80a
82f
82g
82e
90
82b
82d
82c
84b
84a
A'
A
82a
82
80
86
74a
84
88
94e
94d
94
92
94a
94f
94g
M
92a
B
94c
94b
94h
L
C'
92a1
C 68b
74b1
74b4
74b8
80a
59
76
74
78
74b5
90
74b2
74b
84b
82d
82c
68a
84a
82a
A'
A
82
80
86
74a
84
88
M
92
94a
94
94d
94e
94f
94g
94h
92a
94c
94b
B
C'
92a1
C
L 74b
74b7
59
74b8
76
80a
68b
78
90
74b6
74b4
82e
74b5
74
82b
68a
A'
A
82a
82d
82
86
80
V1
74a
84
88
M
94e
94d
94
94f
94g
92
B
94a
94c
94b
92a
92a1
94h
L
C'
C 74b
68b
74b8
59
76
80a
82e
90
74b4
74
68a
A'
82a
82d
86
82
74a
84
80
88
94e
94d
94
94a
94f
94g
M
B
94c
94b
92
92a
L
C'
92a1
94h

MOTOR VEHICLE ASSEMBLY, IN PARTICULAR SEMITRAILER

This application is a continuation-in-part of application Ser. No. 07/967,690, filed on Oct. 27, 1992, now abandoned.

DESCRIPTION

The invention relates to a motor vehicle assembly, in particular a semi-trailer truck, comprising at least two partial vehicles, namely an over-the-road tractor vehicle and an over-the-road trailer vehicle which can be connected with the tractor vehicle, and a plurality of supply lines between the two partial vehicles, where each of the supply lines has a line coupling with a line coupling half on the end towards the tractor vehicle and a line coupling half on the end towards the trailer vehicle, where preferably a plurality of the line couplings, possibly all line couplings, are combined in a multiple coupling in such a way that the line coupling halves on respectively the tractor side are combined in a multiple coupling half on the tractor side and the line coupling halves on the trailer side are combined in a multiple coupling half on the trailer side.

In practice, it has been shown in connection with such motor vehicle assemblies that the amount of force required for coupling or uncoupling the line coupling halves, for example because of twisting of the coupling halves, makes coupling or uncoupling extremely difficult, because of which it is not always possible to assure the correct connection of the supply lines, especially when coupling.

Further prior art results from U.S. Pat. No. 4,624,472.

In contrast thereto, it is the object of the invention to suggest a motor vehicle assembly of the above-mentioned type in connection with which the forces occurring during coupling or uncoupling of the line coupling halves can be controlled better.

This object is attained in that a power device having an engagement element for each of the two line coupling halves is assigned to the line coupling halves of at least one line coupling, where the engagement elements are to be brought into a mutual force transfer engagement after the line coupling halves have been brought into a preparatory coupling position and where at least one of these engagement elements is adjustable in respect to the associated line coupling half, so that after making the force transfer engagement along with the subsequent displacement of the at least one engagement element in respect to the associated line coupling half, there is a forced relative movement between the two line coupling halves in one coupling direction in the sense of bringing these line coupling halves into the coupled state. By employment of the power device of the invention the line coupling halves are moved in a controlled manner in respect to each other because of an orderly engagement of the engagement elements when activating the power device, without additional forces appearing as a result of twisting or the like. In this way it is possible to control the forces occurring during coupling or uncoupling of the line coupling halves better, which makes coupling or uncoupling considerably more easy and assures an orderly connection of the line coupling halves, particularly during coupling.

The power device is of advantage particularly in case of the combination of a plurality of line couplings into a multiple coupling, because in this case the forces required for coupling or uncoupling the line coupling halves are added together. For this reason it is proposed that the line coupling halves which are each associated with one and the same partial vehicle are disposed on a common coupling half support and that at least one engagement element is disposed on each of the two coupling half supports.

To make possible quick coupling of the line coupling halves, it has been provided that the two line coupling halves are embodied as plug coupling halves and that the at least one engagement element is adjustable in the direction of plugging in respect to the associated line coupling half.

To be able to operate the power device in a simple manner, it is proposed that an operating device for the adjustable engagement element is seated on one of the line coupling halves or on a coupling half support.

For further easing of coupling or uncoupling of the line coupling halves, the operating device can have force transfer means, so that an increased actuation path of a manual operating element of the engagement device generates a lesser adjustment path between the two line coupling halves.

An orderly mating of the two line coupling halves can be assured in a simple manner in that the operating device provides the force transfer engagement between the two line coupling halves in a first section of the operating path and, in a second section of the operating path, causes the relative displacement between the two line coupling halves in the sense of bringing these line coupling halves into the coupled state.

Because it is quite customary in commercial freight hauling to exchange trailer vehicles between shippers, and because careful treatment of the leased trailer vehicle by personnel of the other firm is not always assured, it is proposed to provide the adjustable engagement element as a very valuable and sensitive device on the line coupling half on the tractor side.

It is possible to achieve simple manufacture and operation of the adjustable engagement element in that the adjustable engagement element comprises a control element which is guided displaceably in the coupling direction in a guide element, where the guide element itself is disposed displaceably in the coupling direction (A) on the associated line coupling half or the coupling half support, in that the control element furthermore has a control surface extending at a preferably acute angle in respect to the coupling direction, and in that the adjustable engagement element furthermore comprises at least one pull engagement body which is disposed on the guide element movable in a direction extending essentially perpendicularly to the coupling direction, where in the first section of the operating path of the operating element the control surface acts on the pull engagement body so that the latter grips an undercut formed on the other engagement element from behind for providing the force transfer engagement between the two line coupling halves, and where furthermore, in a second section of the operating path of the operating element, the control element brings the guide element with the pull engagement body, and thus the other engagement element, into the coupled state.

Further easing of the operation of the line coupling halves can be achieved in that one of the line coupling halves or coupling half supports, preferably the line coupling half on the trailer side or the coupling half support on the trailer side, is fixedly attached on the respective vehicle section or can be operationally fastened to it.

To be able to prevent the unintentional uncoupling of the line coupling halves it has been provided that the engagement elements are in engagement during operation in the sense of securing the coupled state between the two line coupling halves.

In a further embodiment of this securing it is proposed that the line coupling halves are secured in the coupled state by additional securing means.

At least one of the line coupling halves may be movable by hand unguided for establishing the preparatory coupling position in order to bring the line coupling halves together in a simple manner. In this case it is preferred that one of the two line coupling halves is fixed or operationally fastened on a partial vehicle and the other line coupling half can be brought unguided close to the first one into the preparatory coupling position.

The invention further comprises a motor vehicle assembly in particular a semi-trailer truck, comprising at least two partial vehicles, namely an over-the-road tractor vehicle and an over-the-road trailer vehicle which can be connected with the tractor vehicle, and a plurality of supply lines between the two partial vehicles, where each of the supply lines has a line coupling with a line coupling half on the end towards the tractor vehicle and a line coupling half on the end towards the trailer vehicle, where a plurality of the line couplings, possibly all line couplings, are combined in a multiple coupling in such a way that the line coupling halves on respectively the tractor side are combined in a multiple coupling half on the tractor side and the line coupling halves on the trailer side are combined in a multiple coupling half on the trailer side.

In order to be able to assure in such a motor vehicle assembly that the two partial vehicles can also be connected with a partial vehicle which is not equipped with a multiple coupling half, it has been provided in an embodiment that the line coupling halves of at least one multiple coupling half are connected via flexible intermediate lines and individual quick-release connectors with the conventional individual connectors or line coupling halves of the respective partial vehicle.

If in this case the individual connectors are fixedly disposed on the respective partial vehicle and adapted to the respective quick-release connectors, the multiple coupling on the motor vehicle assembly can be retrofitted in a simple manner by disconnecting the conventional supply lines and connecting the multiple coupling.

However, it is also possible for the flexible intermediate lines to have an operationally permanent connection with fixed supply points of the respective partial vehicle and to be connected to the associated line coupling halves via the respective quick-release connectors. For connection with a partial vehicle which is not equipped with a multiple coupling half it is merely necessary to separate the quick-release connections from the associated line coupling halves and to connect them to the individual connectors of this partial vehicle.

It has been provided in an alternate embodiment that the line coupling halves of at least one multiple coupling half are in permanent connection with fixed connecting points on the respective partial vehicle via flexible intermediate lines and individual quick-release connectors, and that in addition conventional individual connections are provided on this associated partial vehicle. It is possible with this embodiment to connect additional conventional supply lines if needed, i.e. when making a connection with a partial vehicle not equipped with a multiple coupling half.

In order to be able to stow a multiple coupling half on the partial vehicle with which it is associated when this partial vehicle is disconnected from the respectively other partial vehicle, or if this partial vehicle is connected with a partial vehicle which is not equipped with an appropriate multiple coupling half, it is proposed that a stowage device for receiving an associated multiple coupling half is disposed on at least one of the partial vehicles, which permits the stowage of this multiple coupling half, while its line coupling halves are in connection with supply points of the respective partial vehicle via flexible intermediate lines.

The line coupling halves disposed on this multiple coupling half can be protected here from the effects of weather and dirt if the stowage device is embodied to have protective means for the line coupling halves of the multiple coupling half which automatically become effective when the multiple coupling half is stowed in the stowage device.

To be able to protect a multiple coupling half which is fixedly mounted on a partial vehicle against the effects of weather and dirt, too, it is further proposed that this multiple coupling half can be covered by protective means fixed on the associated partial vehicle.

To be able to prevent the escape of compressed air to be prevented when the line coupling halves are disconnected it has been provided that a line coupling half designed for compressed air supply is embodied with a check valve.

For making it still easier for the operator to couple the multiple coupling halves, it is suggested according to a further development of the present invention that the actuating means comprises a drive motor. In this connection, it is especially advantageous when the drive motor is provided on a multiple coupling halve connected with the truck vehicle, as the energy required for operating the drive motor, be it energy in the form of electric current for driving an electric motor or be it energy in the form of compressed air for driving a pneumatic motor or the like, is available at the truck vehicle to a substantially unlimited extent.

According to another aspect, the present invention relates to a motor vehicle assembly comprising two martial vehicles, namely a truck vehicle and a trailer vehicle, wherein the trailer vehicle is connected with the truck vehicle by mechanical coupling means for joint drive, wherein further at least one supply line is provided between the truck vehicle and the trailer vehicle, wherein further the supply line has a supply line coupling, wherein further the supply line coupling has two coupling halves, wherein further these two coupling halves are—in a coupling direction—couplable with each other towards a coupling state and are separable from each other, at least one moving means is provided in order to move the two coupling halves in a direction parallel to the coupling direction relative to each other, wherein further the moving means comprise an active mover element being connected with a first coupling half and being adjustable with respect to the first coupling half parallel to the coupling direction by drive means, wherein further a second coupling half is substantially immovably connected with a passive mover element, wherein further this active mover element is provided with active motion transmitting means, wherein further the passive mover element is provided with passive motion transmitting means, wherein further the active motion transmitting means are movably attached to the active mover element substantially transversely to the coupling direction and are adjustable by control means to be brought selectively into or out of engagement with the passive transmitting means.

In such a motor vehicle assembly, those parts of the first and second coupling halves which are important for establishing the motion transmitting engagement, namely especially the active and passive mover elements, are not brought into mutual engagement directly by hand. Caused by the actuation of the drive means with the aid of the control means,the active motion transmitting means are rather adjusted with respect to the active mover element such as to be brought into motion transmitting engagement with the passive motion transmitting means. The establishment of motion transmitting engagement is therefore effected in a controlled and reproducible manner so that a considerable reduction of wear of the moving means is achieved.

An especially simple and effective adjustment of the active motion transmitting means relative to the active mover element is achieved if the first coupling half is connected with the control element which is adjustable with respect to the first coupling half parallel to the coupling direction along a control element path, if the control element is adjustable in a first section of the control element path also with respect to the active mover element in order to adjust the active motion transmitting means with respect to the active mover element, if the control element is connected with the active mover element in a second section of the control element path for common movement, and if the control element is provided with drive means. The adjustability of the control element relative to the active mover element is realized in a constructionally simple manner by guiding the control element in a passage of the active mover element, which passage extends parallel to the coupling direction.

In a simply constructed embodiment, the active motion transmitting means comprise at least one motion transmitting body which is movably guided transversely to the coupling direction in a transverse guide of the active mover element. In this embodiment, a control surface inclined with respect to the coupling direction is formed on the control element; this control surface interacts with the at least one motion transmitting body, and the motion transmitting body is formed at a side remote from the control surface for engagement with the passive motion transmitting means of the passive mover element. Here, the inclined control face can in a simple manner adjust the motion transmitting body relative to the active mover element and cause the entrainment of the active mover element along the second section of the control element path.

Furthermore, the present invention suggests that the active motion transmitting means and the passive motion transmitting means are adapted at least for a movement of the second coupling element with respect to the first coupling element towards the establishment of a coupling between the two coupling halves.

It is of advantage if the active and passive motion transmitting means are also adapted for a movement of the second coupling element with respect to the first coupling element in an uncoupling sense. Alternatively, it is also possible to provide on the active and the passive mover elements respective stop means suitable for moving the second coupling element with respect to the first coupling element in an uncoupling sense.

A further embodiment of the present invention suggests that the drive means are located at a stationary place with respect to guide means which are connected with the first coupling half, that the active mover element is guided in the guide means parallel to the coupling direction, that the control element is guided in the active mover element parallel to the coupling direction, that biasing means are provided for biasing the active mover element relative to the guide means towards a resting position corresponding to the uncoupled state of the two coupling halves, that the drive means are in driving engagement with the control element, and that respective stop means are provided on the active mover element and on the control element, which stop means cause in the second path section of the control element path movement of the active mover element against the action of said biasing means by said control element. This embodiment is characterized by an especially simple construction of the moving means, while on the other hand the conditions required for attaining the different relative movements of control element, active mover element and guide means relatively to each other are reliably safeguarded.

To be able to prevent that the coupling halves are unintentionally uncoupled when a force is exerted onto said active mover element along said coupling direction, it is provided that the drive means are self-locking drive means. Alternatively or preferably additionally, it is intended that the drive means are provided with securing means which secure the coupled state of the two coupling halves.

To be able to couple during one coupling step simultaneously a plurality of first coupling halves with a corresponding plurality of second coupling halves, it is suggested that the active mover element is provided on a first coupling half carrier which carries respective first coupling halves of a plurality of line couplings, and that the passive mover element is provided on a second coupling half carrier which carries respective second coupling halves of this plurality of line couplings.

In order to prevent damages to the first and second coupling halves caused by canting or the like, it is suggested that the first and second coupling halves are associated with respective prepositioning means which are mutually engageable by an operator and which guide an approach movement of the two coupling halves in said coupling direction in a mutual orientation allowing the establishment of said coupling in response to said approach movement. The prepositioning means may comprise a pair, preferably two pairs of pilot bars and a pilot bar passage.

For protecting the sensible parts of the coupling halves from external influences, e.g. climatic influences, such as humidity or the like, it is provided that the two coupling halves of the at least one line coupling have coupling engagement faces which are in a coupled state encased in a shelter. It is then preferable that the shelter houses respective coupling engagement faces of respective coupling halves of a plurality of line couplings.

As especially the functional parts of the moving means are sensitive to outer influences, it is further suggested that the shelter houses the motion transmitting means of the active and passive mover elements.

A simple construction of the shelter can be obtained if the shelter is defined by respective shelter limiting faces which are connected with the two coupling halves, and if at least one of said shelter limiting faces is provided with compression sealing means, said compression sealing means being sealingly activated in response to said two coupling halves of said at least one line coupling approaching said coupling state. In this case, the shelter limiting faces may be formed by carrier plates to which first and second coupling halves of a plurality of line couplings and furthermore the active and the passive mover elements of the at last one moving means are attached.

For facilitating for the operator the process of coupling the multiple coupling halves, a further embodiment of the invention suggests that the drive means comprise a drive motor. Then, it is of special advantage if the drive motor is mounted to one coupling half connected with the truck vehicle, as the energy required for operating the drive motor, be it energy in the form of electric current for driving an electric motor or be it energy in the form of compressed air for driving a pneumatic motor or the like, is available at the truck vehicle in practically unlimited amounts.

As an alternative to the drive motor, it is however also possible that the drive means comprise a manually operated device. This manually operated driving device may comprise a manually operated driving lever which is pivoted about a pivot axis extending substantially orthogonal with respect to the coupling direction.

For facilitating the coupling process, a further embodiment of the present invention suggests that one of the two coupling halves is connected through a flexible line section with the one of the two partial vehicles—truck vehicle and trailer vehicle—and that the other coupling half is rigidly fixed to the respective other partial vehicle.

During daily operation, the flexible line sections of the motor vehicle assembly are highly subject to the risk of being damaged. As it is quite common in the transporting industry that trailer vehicles are mutually exchanged among the transporting agencies, and as a careful handling of the leased trailer vehicle by the personnel of the respective other transporting agency is not always sure, for achieving long life of the flexible line sections the present invention suggests that the first coupling half is connected via the flexible line section with the truck vehicle and that the second coupling half is substantially rigidly fixed to the trailer vehicle.

To be able to prevent damages to the flexible line section and also to the coupling half connected therewith when driving with the truck vehicle alone, it is suggested that the one coupling half connected with the flexible line section is attachable to an associated one of the two partial vehicles—truck vehicle and trailer vehicle —by means of a holding device when this coupling half is separated from the other coupling half.

A reliable attachment of the coupling half to the holding device is attained by providing the holding device with a passive mover element such that said first coupling half is arrestable to the holding device with the aid of the moving means. To be able to protect also here the coupling halves from outer influences, e.g. climatic influences, it is suggested that a shelter limiting face of the first coupling half defines together with a shelter limiting face of the holding device a shelter when the first coupling half has been connected with the holding device.

To be able to protect also the other coupling half in its uncoupled state from external influences, it is suggested that the second coupling half when being separated from said first coupling half is protectable from atmospheric influence by cover means. For attaining a reliable fastening of the cover means on the other coupling half, one can further provide that the cover means are provided with holding means which can be brought into holding engagement with coupling engagement faces of said second coupling half.

Under a further aspect, the present invention relates to an over-the-road partial vehicle which is connectable by mechanical coupling means with at least one over-the-road joint partial vehicle (in the following also referred to as connection partial vehicle) of a plurality of joint partial vehicles to form a motor vehicle assembly, in which motor vehicle assembly the partial vehicle and the respective joint partial vehicle are connected to each other by a plurality of flexible supply lines fulfilling different supply functions such as energy and signal transmission, wherein further the partial vehicle is equipped a) with a group of line connecting halves on the partial vehicle side which are connectable with a corresponding group of line connecting halves on the connection partial vehicle side by individual coupling operations to obtain respective line connections, and b) with a group of line coupling halves on the partial vehicle side which are constructionally combined to a multiple coupling half unit on the partial vehicle side such that they can be coupled with a corresponding group of line coupling halves on the connection partial vehicle side which are constructionally combined to form a multiple coupling half unit on the joint partial vehicle side by a common coupling operation to obtain a multiple coupling unit and wherein both a line connecting half on the partial vehicle side as well as a line coupling half on the partial vehicle side are allocated to respective identical supply functions.

By using the group of line connecting halves on the partial vehicle side and the group of line connecting halves on the connection partial vehicle side, such a partial vehicle can be connected with the connection partial vehicle by means of the subsequent connection of individual line connecting halves on the partial vehicle side with associated line connecting halves on the connection partial vehicle side. It is however also possible to connect the partial vehicle with a connection partial vehicle by using the line coupling halves on the partial vehicle side combined to the multiple coupling half unit on the partial vehicle side and the line coupling halves on the connection partial vehicle side combined to the multiple coupling half unit on the connection partial vehicle side. The partial vehicle of the present invention exhibits advantages especially during the introduction phase of the multiple coupling, as it can be used both with a connection partial vehicle being provided with common individual connections (group of line connecting halves on the connection partial vehicle side) as well as with a connection partial vehicle being already equipped with a multiple coupling half unit.

When at least one of the line coupling halves on the partial vehicle side is constantly connected with the line connecting half on the partial vehicle side allocated to the same supply function through a supply line fixedly connected with the partial vehicle, one of the two connection possibilities may be selected if such a partial vehicle comes to meet a similarly equipped connection partial vehicle.

When at least one of the line coupling halves on the partial vehicle side is releasably connected with the line connecting half on the partial vehicle side allocated to the same supply function through a supply line fixedly connected with the partial vehicle and through an individual quick connection, either separate supply lines for connecting the two partial vehicles can be used for the connection with a usually equipped connection partial vehicle, or the individual quick connections can be discoupled from the associated line coupling halves and can be used for the connection with the connection partial vehicle.

An especially simple and cost-saving possibility of subsequently equipping a usually equipped partial vehicle with a multiple coupling half unit or with an entire multiple coupling unit, respectively, is achieved if at least one of the line coupling halves on the partial vehicle side is releasably connected with the line connecting half on the partial vehicle side allocated to the same supply function through a supply line releasably connectable with this line connecting half on the partial vehicle side through an individual quick connection.

In order to facilitate the coupling process, a further improvement according to the present invention provides that the multiple coupling half unit on the partial vehicle side is substantially rigidly fixed to the partial vehicle.

For facilitating service or repair works, it is suggested that the multiple coupling unit on the partial vehicle side is releasably fixed to a carrier of the partial vehicle.

To be able to additionally simplify the coupling process, the present invention provides at least one moving means for accomplishing the coupling between the multiple coupling half unit on the partial vehicle side and the multiple coupling half unit on the connection partial vehicle side to obtain a multiple coupling unit.

Another improvement according to the present invention provides that the partial vehicle is a trailer vehicle which is connectable for common drive with the connection partial vehicle being a truck vehicle through the mechanical coupling means.

Further, at least one of the first group of second line coupling halves and of the second group of second line coupling halves can be connected with the further partial vehicle or with another additional partial section by additional releasable line couplings.

Figure 6:
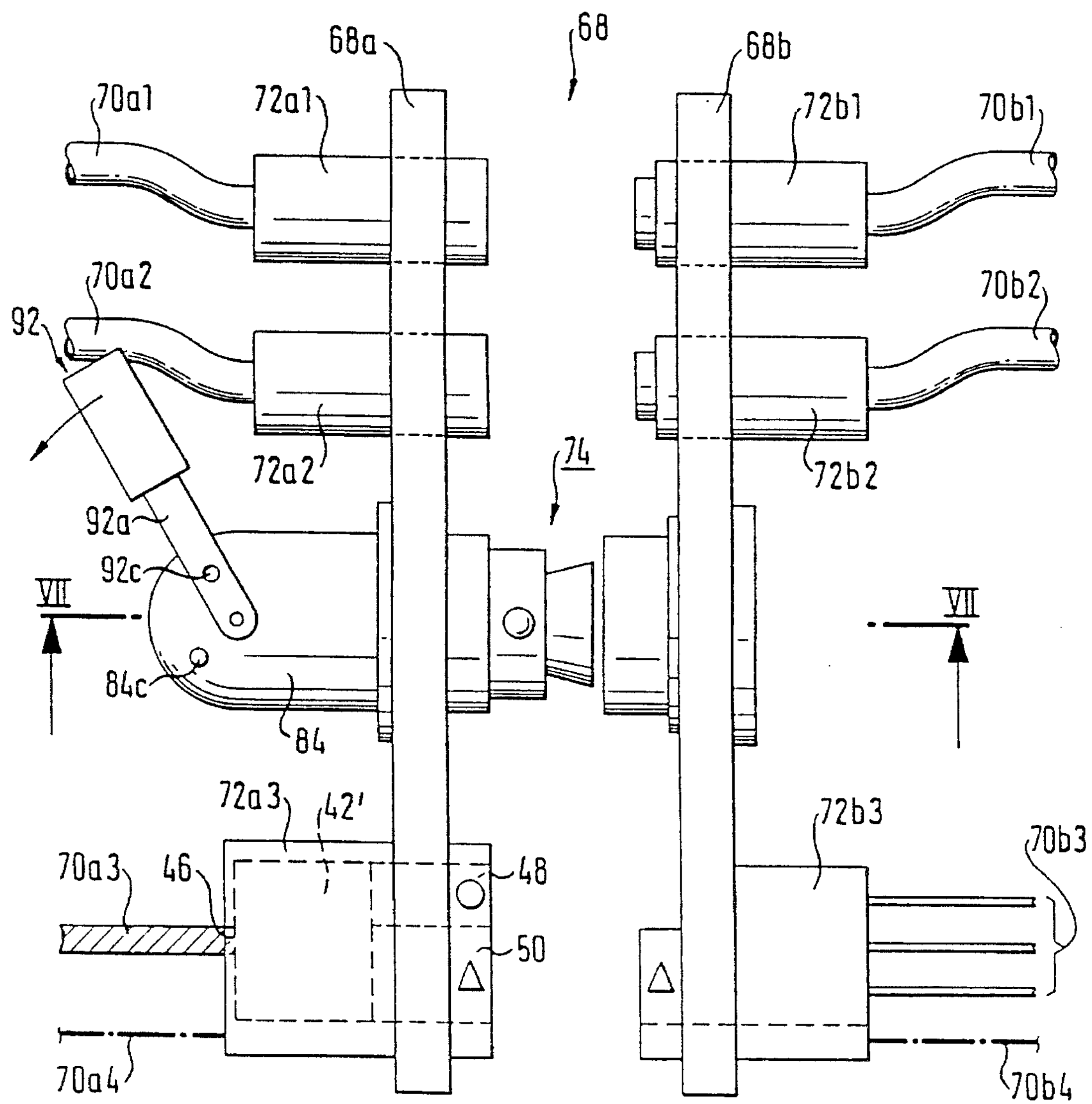
Figure 7:
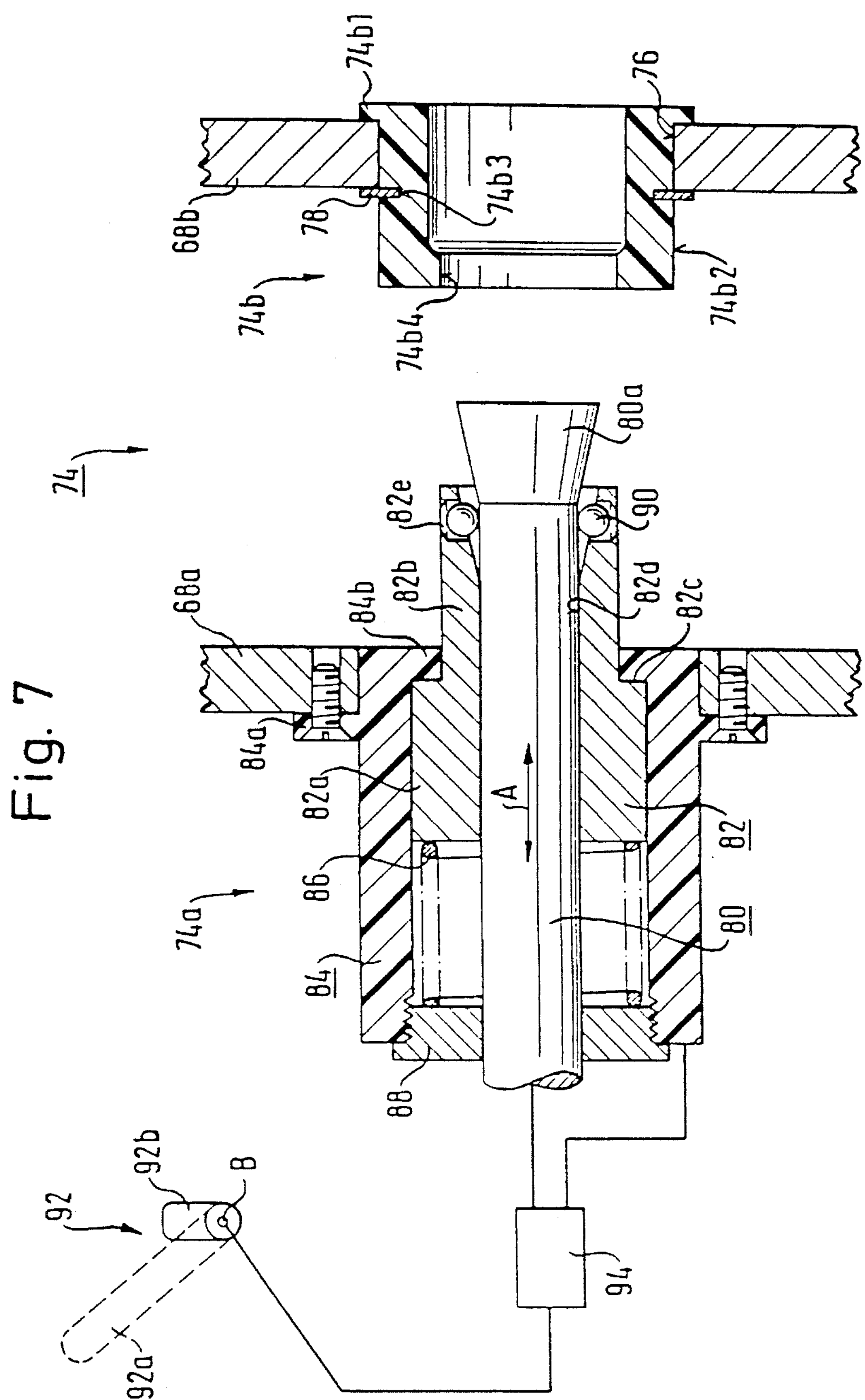
Figure 8:
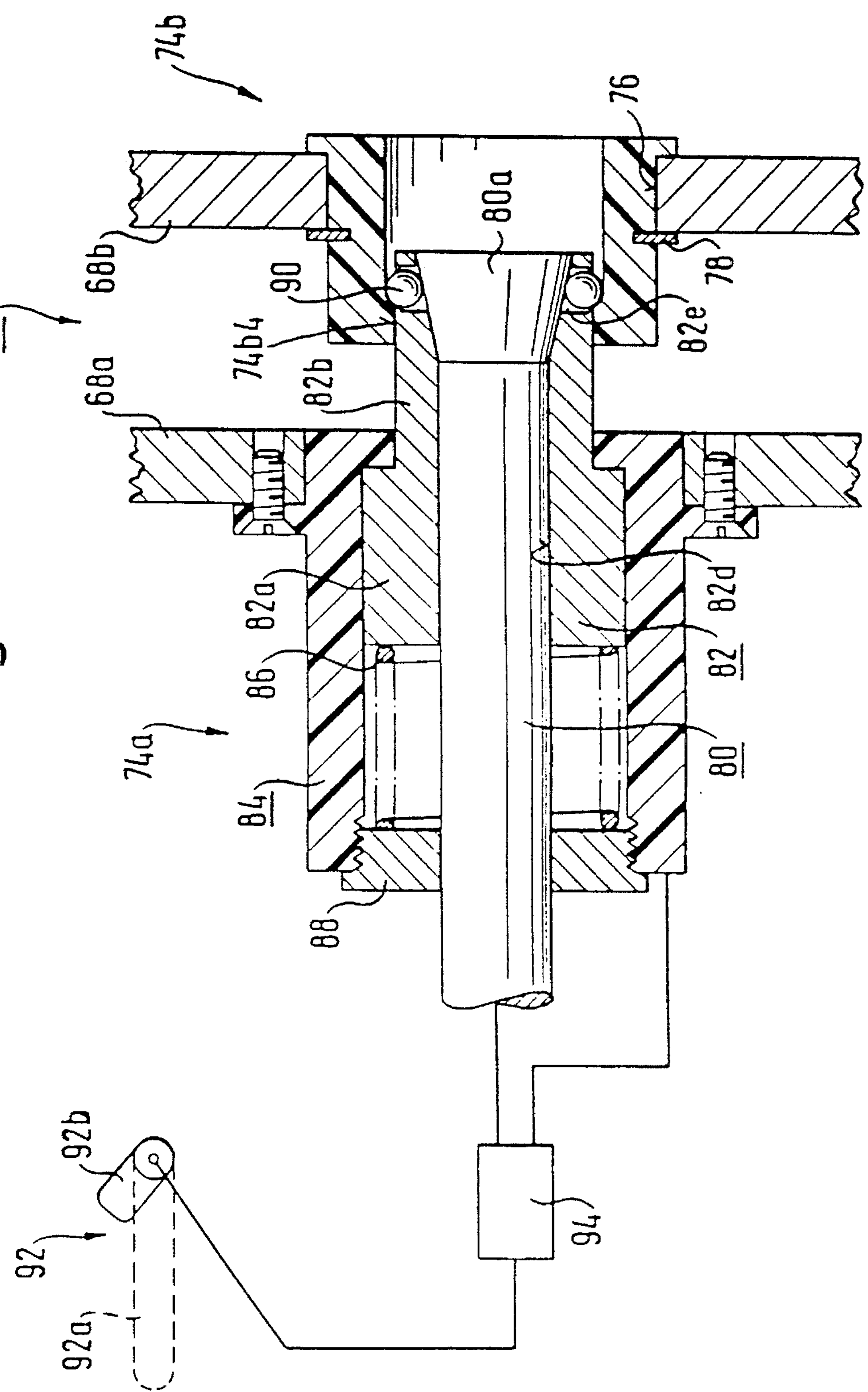
Figure 9:
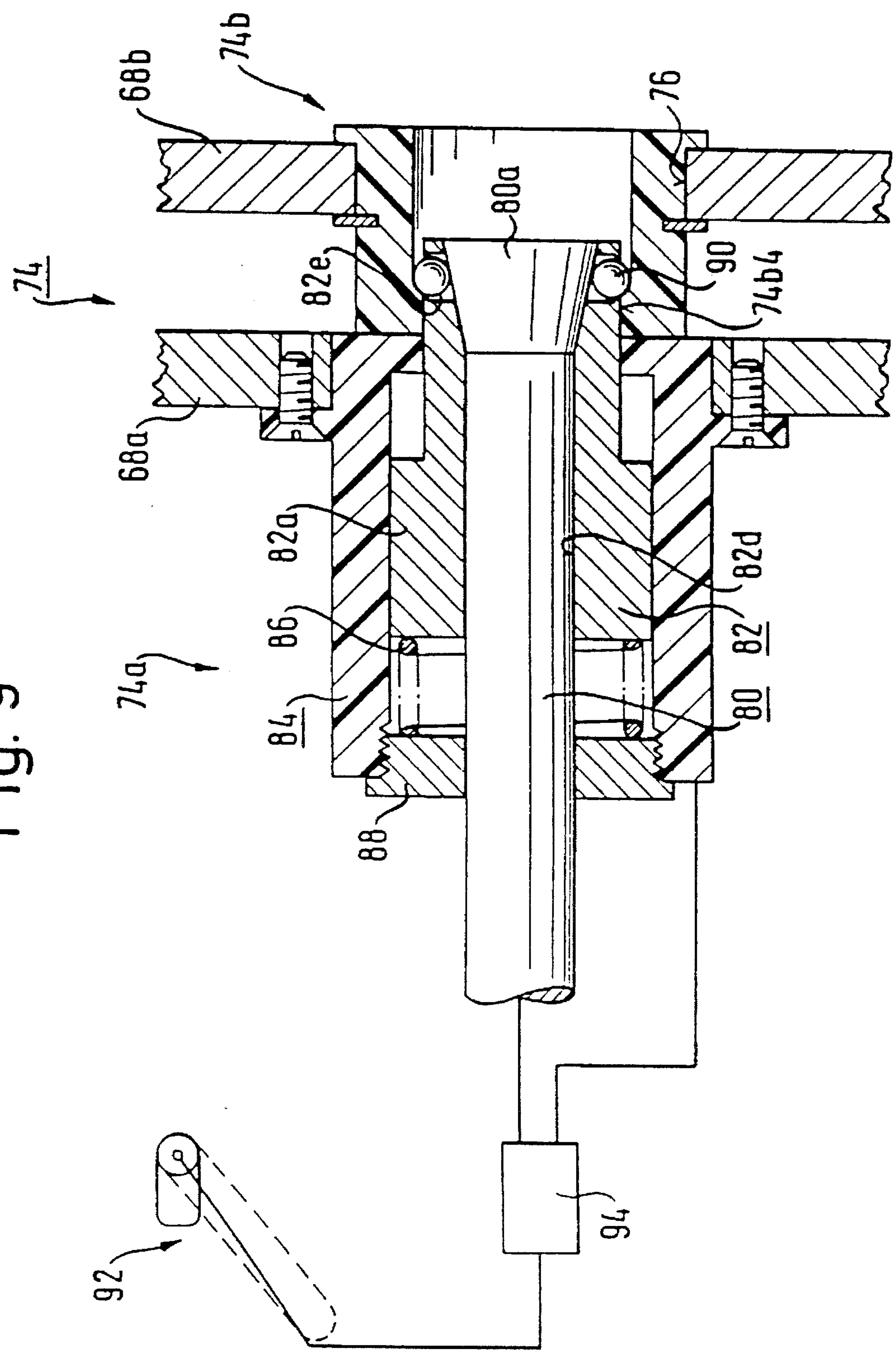
Figure 10:
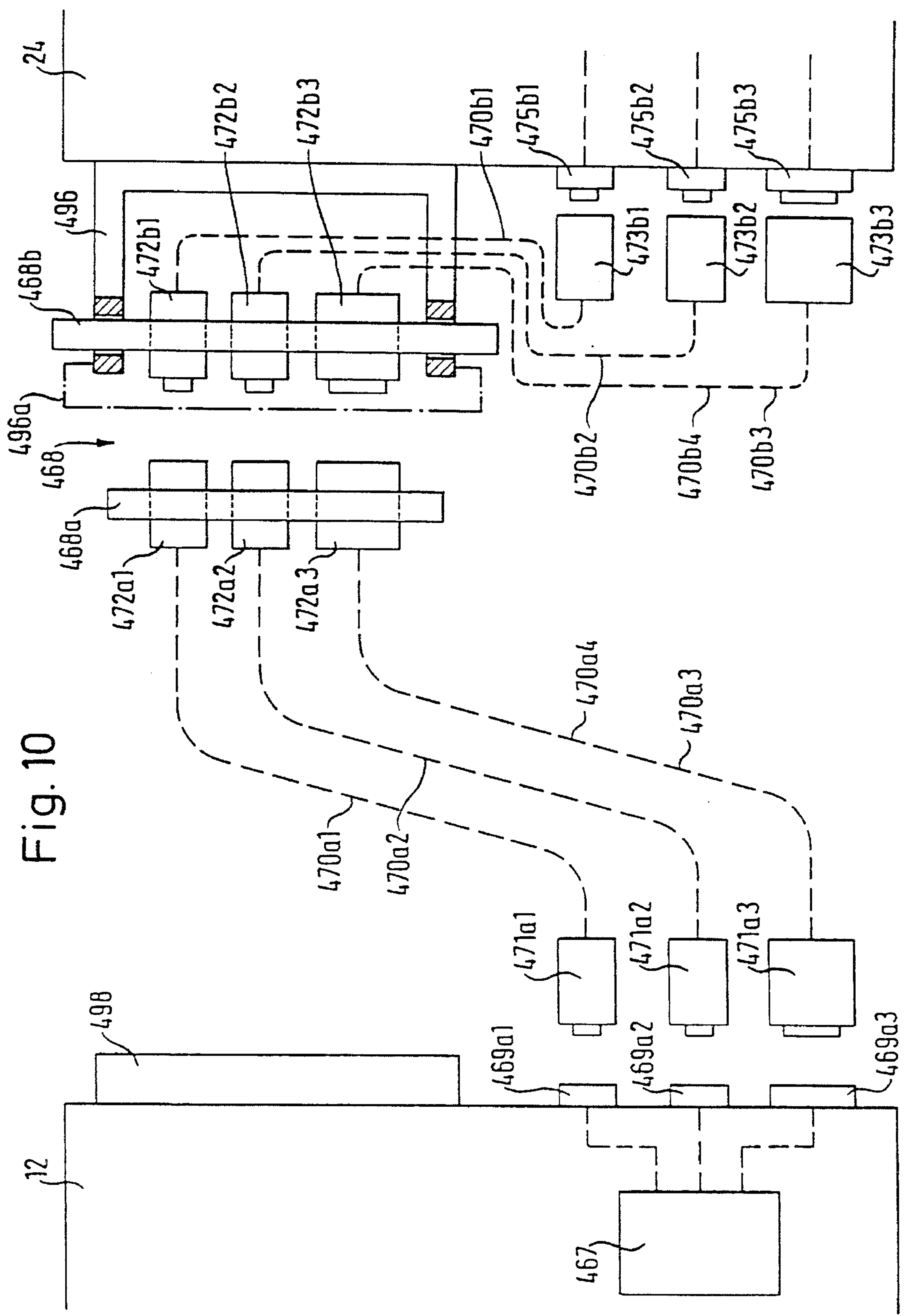
Figure 11:
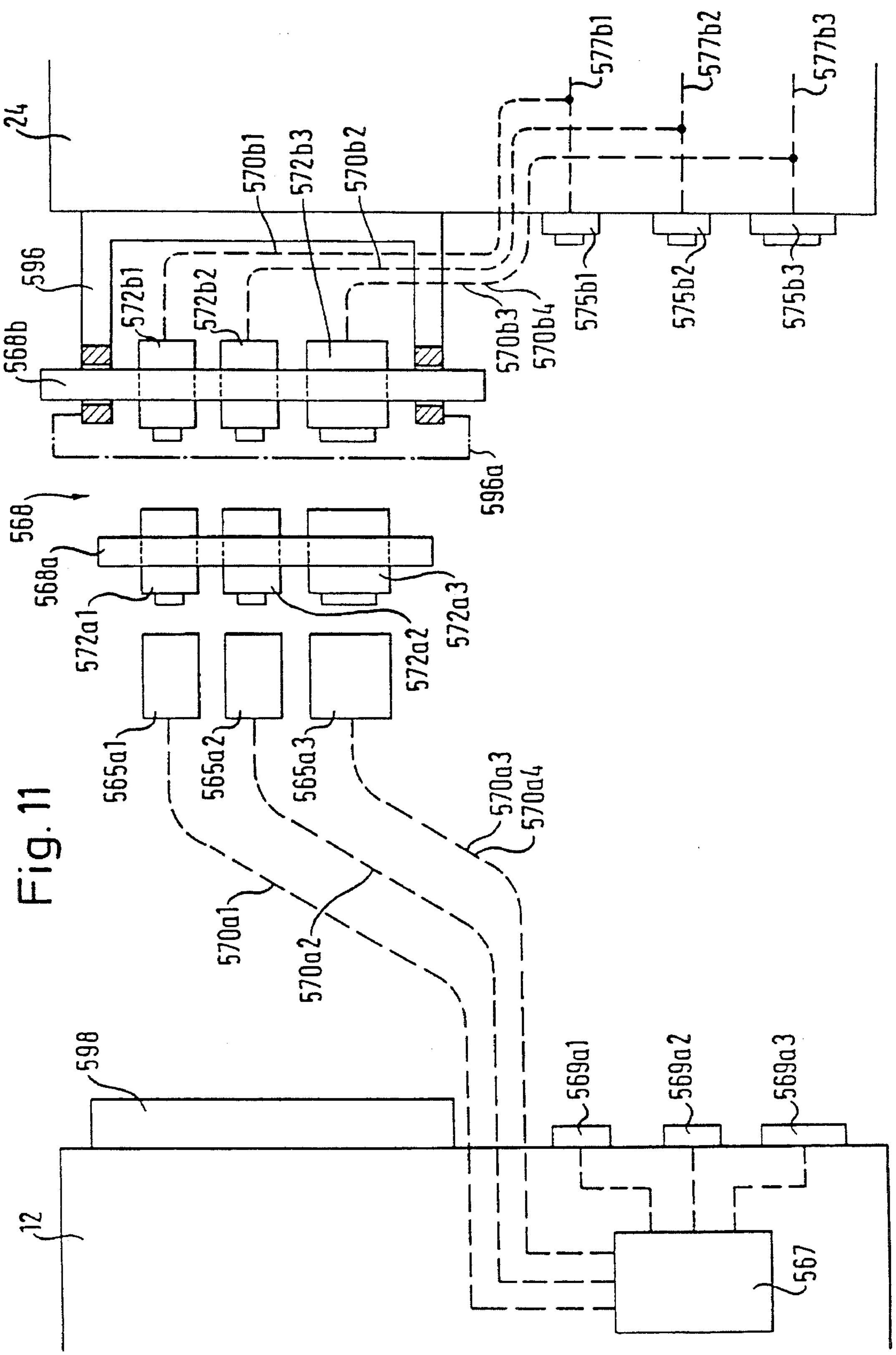

The invention will be described below by means of exemplary embodiments and the attached drawings. Shown are in:

FIG. 1 a schematic view for explaining the connection of partial vehicles equipped with different transmission systems;

FIGS. 2 to 5 schematic views of different embodiments of a data converter;

FIG. 6 a schematic top view of two multiple coupling halves in the uncoupled state;

FIG. 7 a partial section along the line VII—VII in FIG. 6 of the multiple coupling halves in the uncoupled state;

FIGS. 8 and 9 views analogously to FIG. 7, where the multiple coupling halves are in the force engagement state (FIG. 8) or in the coupling state (FIG. 9); and FIGS. 10 and 11 schematic views for explaining different possibilities for connecting the multiple coupling halves with the respective partial vehicles.

Figure 12:
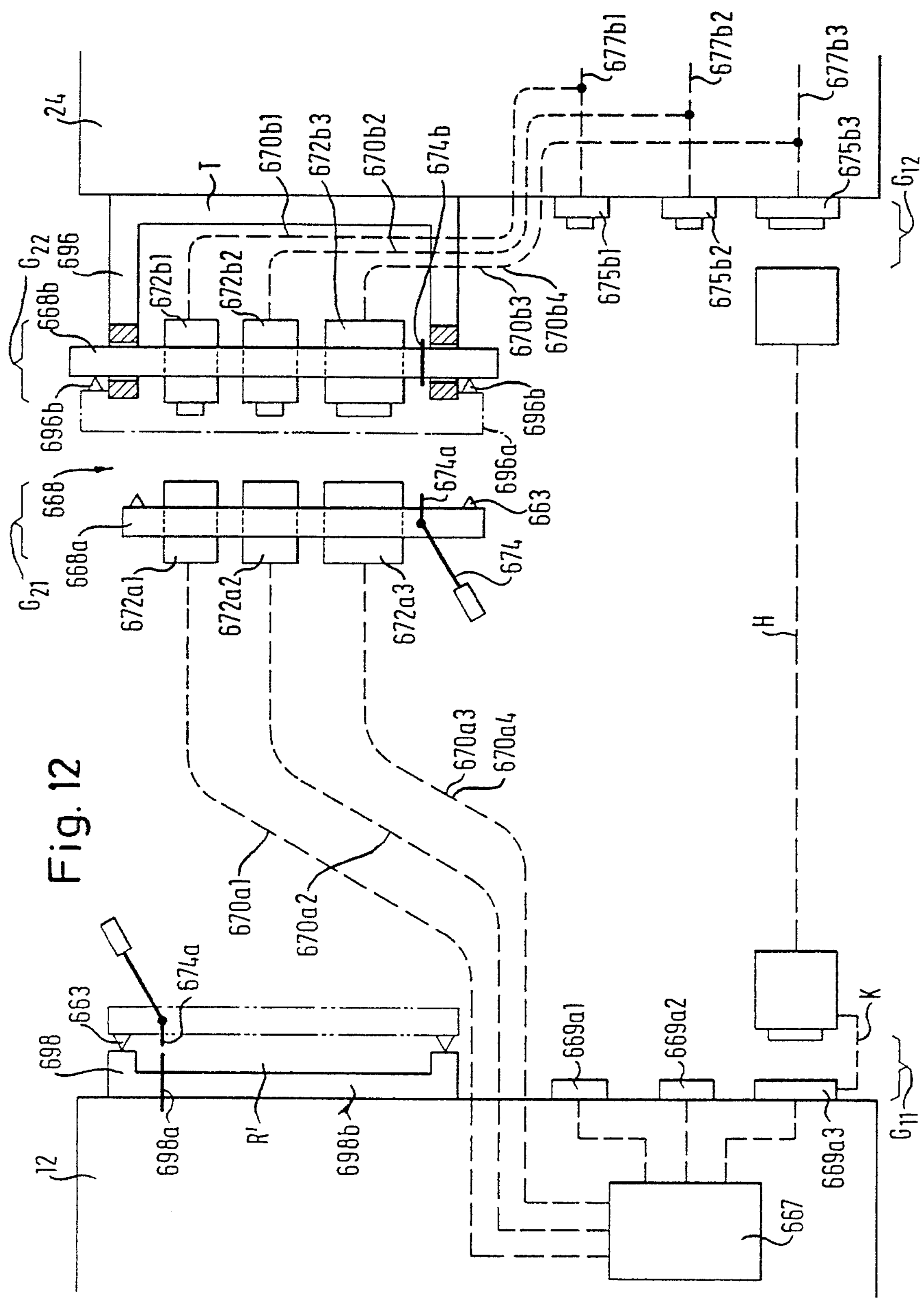
Figure 13:
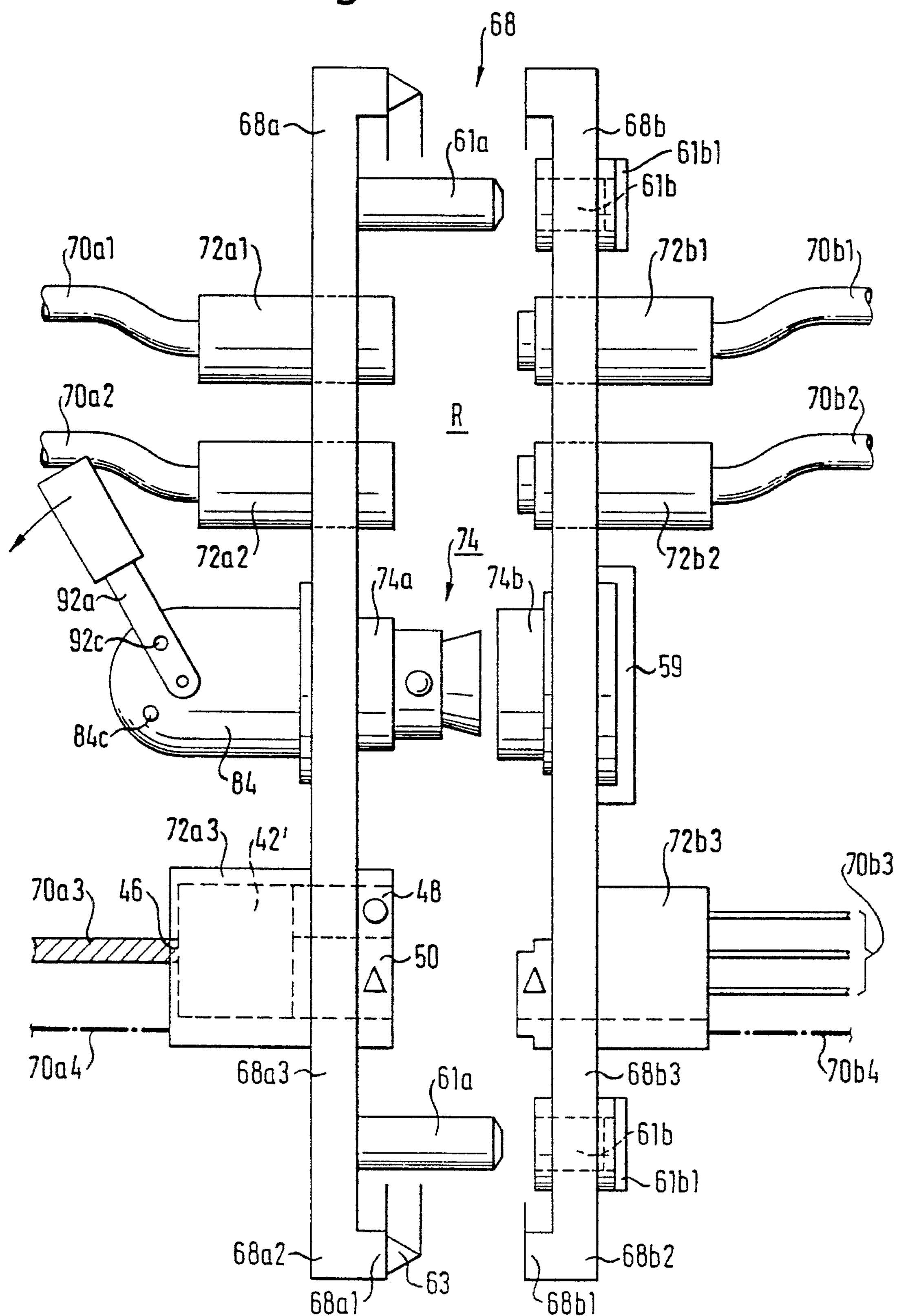
Figure 14:
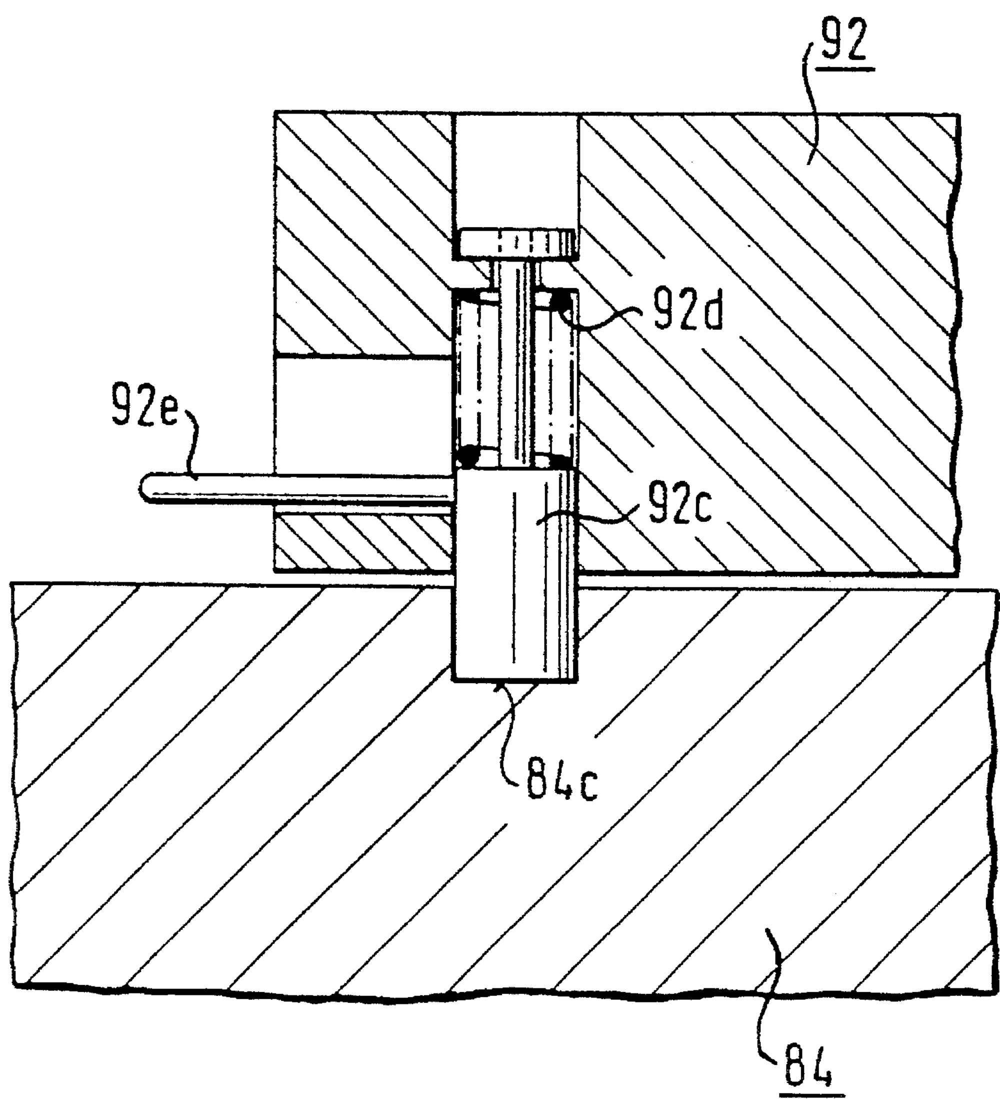
Figure 15:
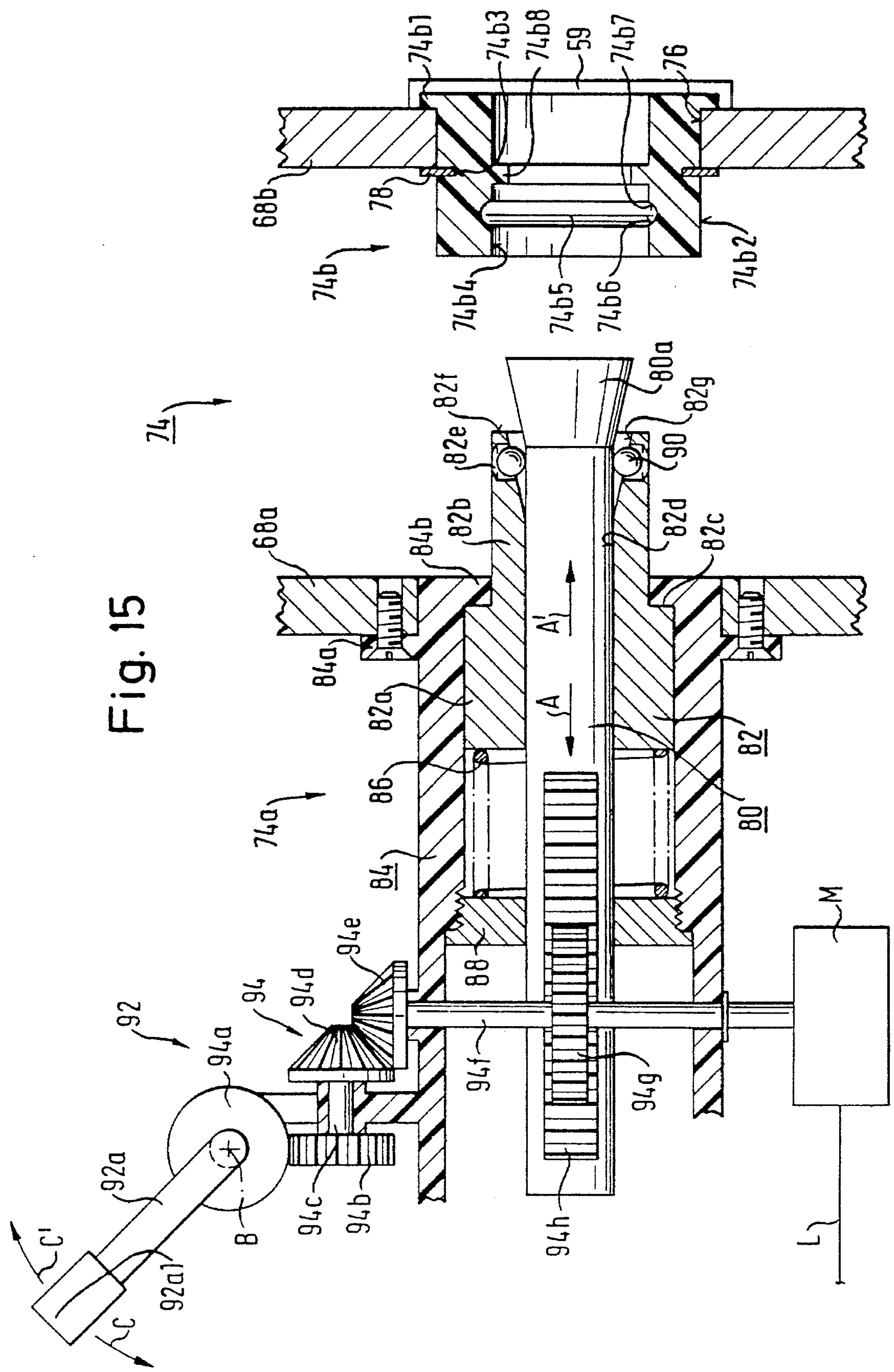
Figure 16:
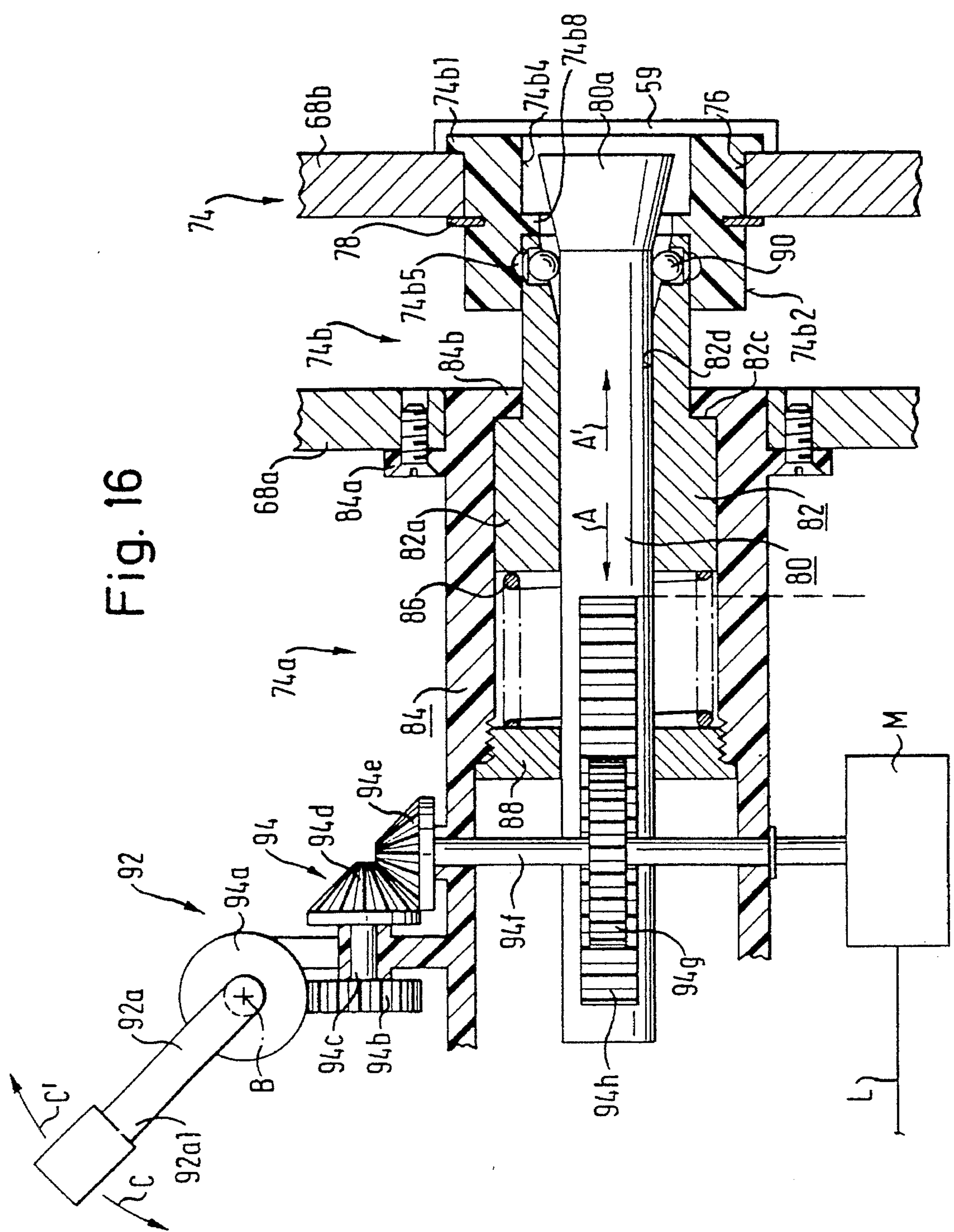
Figure 17:
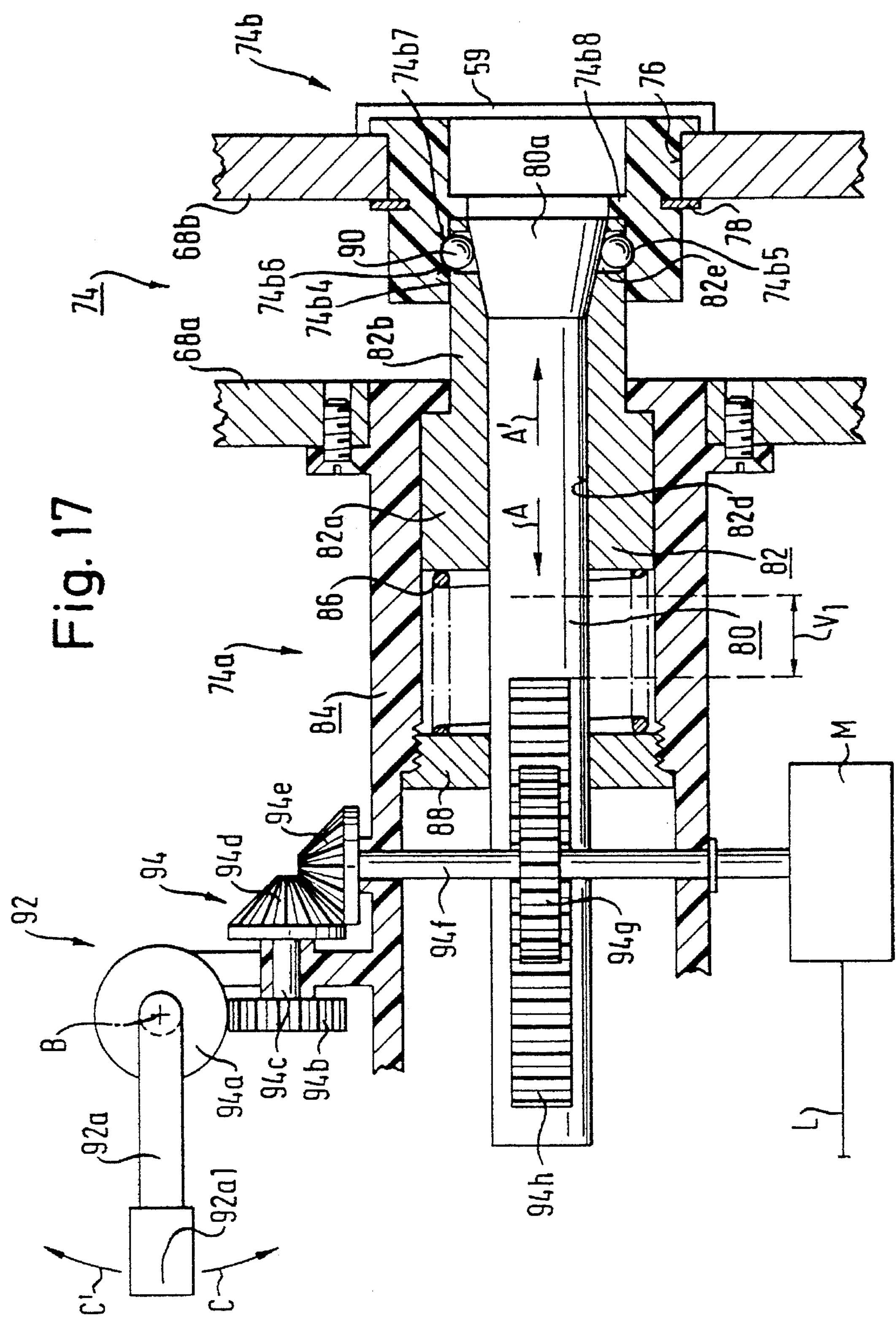
Figure 19:
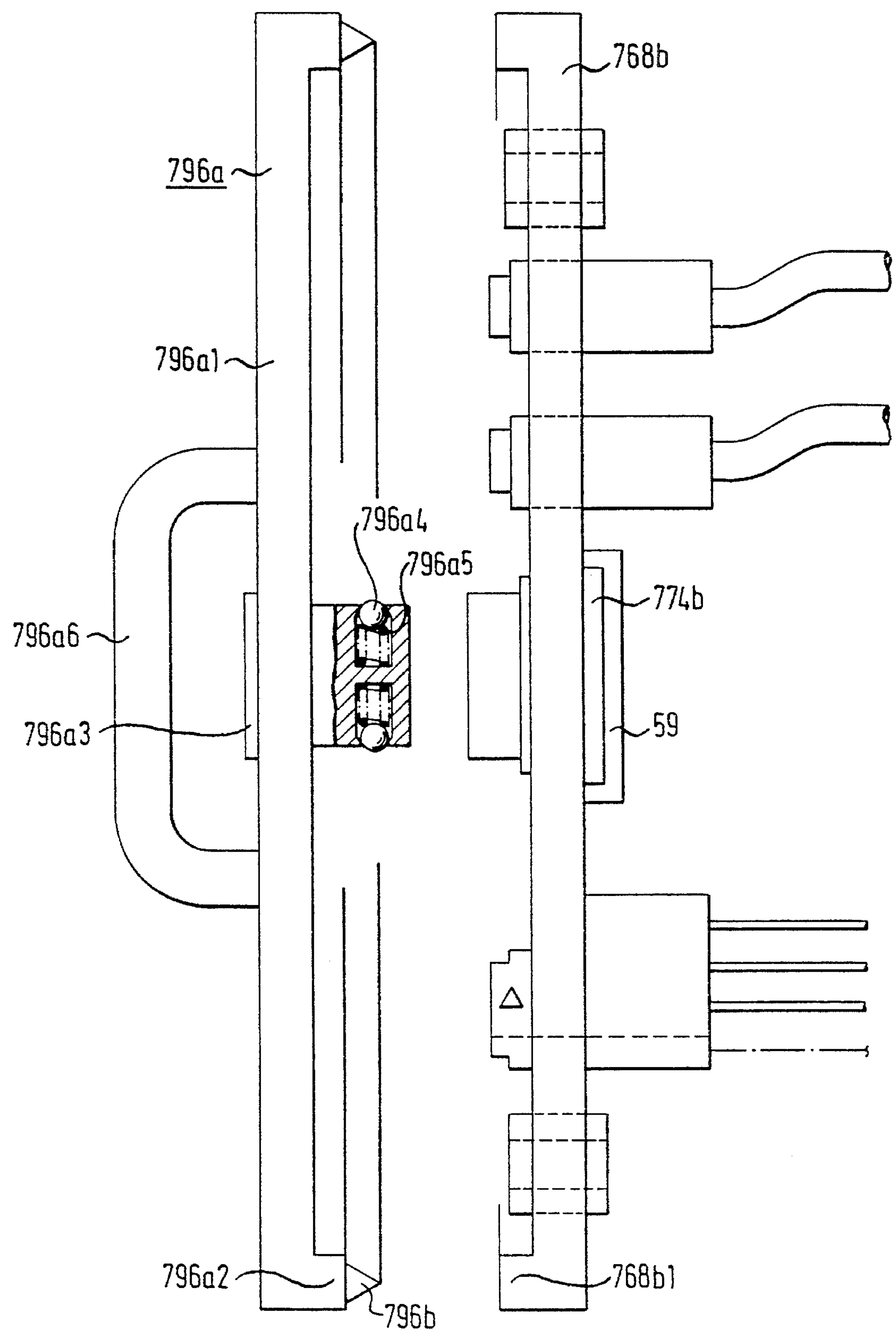

FIG. 12 a schematic view for explaining a further possibility for connecting the multiple coupling halves to the respective partial vehicles;

FIG. 13 a view analogous to FIG. 6 showing a further embodiment of two multiple coupling halves in the uncoupled state;

FIG. 14 a schematic sectional view for explaining the securing means of the multiple coupling halves;

FIGS. 15 to 18 a schematic sectional view analogous to FIGS. 7 to 9 showing a further embodiment of the multiple coupling halves, FIG. 15 showing the uncoupled state, FIG. 16 showing the preparatory state, FIG. 17 showing the motion transmitting engagement state, and FIG. 17 showing the coupled state;

FIG. 19 a schematic view analogous to FIG. 6 showing a trailer-side multiple coupling half with cover element.

A semi-trailer truck, generally identified by 10, is shown in FIG. 1. A tractor vehicle 12 of the semi-trailer truck 10 is equipped with a data bus transmission system 14 having a data bus line 16. Control data are transmitted via the data bus line 16, which are sent from a brake pedal unit 18 to a brake system 20 and a brake light 22 of the tractor vehicle 12. It is furthermore possible to send status data from the brake system 20 to the brake pedal unit 18 via the data bus line 16. In the instant case the brake pedal unit 18 forms a control unit and the brake system 20 and the brake light 22 form function units of the tractor vehicle 12. In addition to these control and function units, the tractor vehicle 12 is equipped with further control and function units, not shown, for example turn indicator switches and turn indicator lights and the like.

In a data bus transmission system, all control and function units connected to the data bus line are assigned an "address". In the course of data transmission, address data corresponding to the address of the receiving unit are placed in front of the control or status data to be sent. Each one of the units receives all data transmitted via the data bus line and checks by means of the address data whether the just transmitted data are intended for it. If this is the case, the unit performs a process which corresponds to the control data transmitted with these address data. For example, in response to a brake signal from the brake pedal unit 18, the brake system 20 opens a control valve (not shown) of a compressed air brake (also not shown).

Furthermore, two semi-trailers or trailer vehicles 24 or 24' are shown in FIG. 1. The tractor vehicle 12 is equipped with a fifth wheel 26 for providing a pulling and pushing connection between the tractor vehicle 12 and the respectively one of the semi-trailers 24 and 24', and the semi-trailers 24 and 24' have king pins 28 or 28'.

In the connected state of the vehicle sections, a plurality of supply lines also extends from the tractor vehicle to the trailer vehicle for supplying the function units of the trailer vehicle, for example compressed air lines for supplying a pneumatic braking system and an air cushion system with compressed air, electrical lines for supplying the lighting devices and the like with current, and control lines to supply the function units with the respective control signals. Only control lines 36 or 36' are shown in FIG. 1.

The semi-trailer 24 is equipped with a data bus transmission system having a data bus line 30. This has the advantage that each of the individual function units of the semi-trailer 24 do not need to be provided with a separate control line and instead all function units can be triggered by a data bus line 30 looped through the semi-trailer 24. In accordance with FIG. 1, a brake system 32 and a brake light 34 are connected as downstream function units to the data bus line 30. It is of course possible to connect additional function units, not shown, to the data bus transmission system. For example, a control valve for regulating the bellows pressure of the air cushion system of the semi-trailer 24 can be triggered via the data bus line 30. It is possible for this purpose to transmit measurement data from a pressure gauge measuring the bellows pressure to a control unit via the data bus line 30. It is then also possible in a simple manner to determine the weight of the load resting on the semi-trailer from these measurement data and to display it to the driver of the semi-trailer truck. It is also conceivable to transmit measurement and control data for monitoring the tire pressures and many other things via the data bus line 30.

So that in the connected state of the tractor vehicle 12 with the semi-trailer 24 it is possible to transmit the respective control signals to the function units of the semi-trailer 24, the tractor vehicle 12 is provided with a connecting line 36 with a data bus connector plug 38, and the semi-trailer 24 with a data bus connecting bush 40 corresponding to the connector plug 38. In this way it is possible, after the connection between the connector plug 38 and the connecting bush 40 has been made, to transmit brake signals issued by the brake pedal unit 18 also to the brake system 32 and the brake light 34 of the semi-trailer 24.

The semi-trailer 24' is equipped with a single line transmitting system having signal lines 30' and 30". The signal line 30' is connected with its one end with a brake system 32' and the signal line 30" is connected with its one end with a brake light 34'. The signal lines 30' and 30" are connected with their respectively other ends with a single line connecting bush 40'. So that in the connected state of the tractor vehicle 12 with the semi-trailer 24' the respective control signals can also be transmitted to the function units of the semi-trailer 24' the tractor vehicle 12' is provided with a connecting line 36' having a single line connector plug 38' corresponding to the connecting bush 40', and with a data converter 42. The data converter 42 converts the data to be transmitted from a data form required by the data bus transmission system, hereinafter shortened to data bus form, into a data form required by the single line transmission system, hereinafter shortened to single line form, and vice versa. In this way it is possible, after the connection between the connector plug 38' and the connecting bush 40' has been made, to transmit brake signals emitted by the brake pedal unit 18 also to the brake system 32' and the brake light 34' of the semi-trailer 24'.

In FIG. 1 the data converter has been shown to be fixedly mounted on the tractor vehicle 12. So that not only trailer vehicles with the data bus transmission system, for example the semi-trailer 24, but also trailer vehicles with the single line transmission system, for example the semi-trailer 24', can be connected to the data bus transmission system of the tractor vehicle, the data converter 42 is embodied on the side towards the trailer vehicle with a data bus output as well as with a single line output. A data converter preferably usable in the tractor vehicle 12 in accordance with FIG. 1 will be described in detail below by means of FIG. 2.

So that no mix-ups can occur between the connector plugs 38 or 38' on the one hand and the connecting bushes 40 or 40' on the other when making the connections, for example by connecting the data bus connector plug 38 with the single line connecting bush 40' the data bus connection 38/40 and the single line connection 38'/40' are embodied in different shapes, as has been indicated in a rough schematic way in FIG. 1 by means of circle symbols for the data bus connection and triangle symbols for the single line connection.

Although the use of a data converter in a tractor vehicle equipped with a data bus transmission system has been described with reference to FIG. 1, the same advantages can be obtained with the use of a data converter in a tractor vehicle equipped with a single line transmission system.

Figure 2:
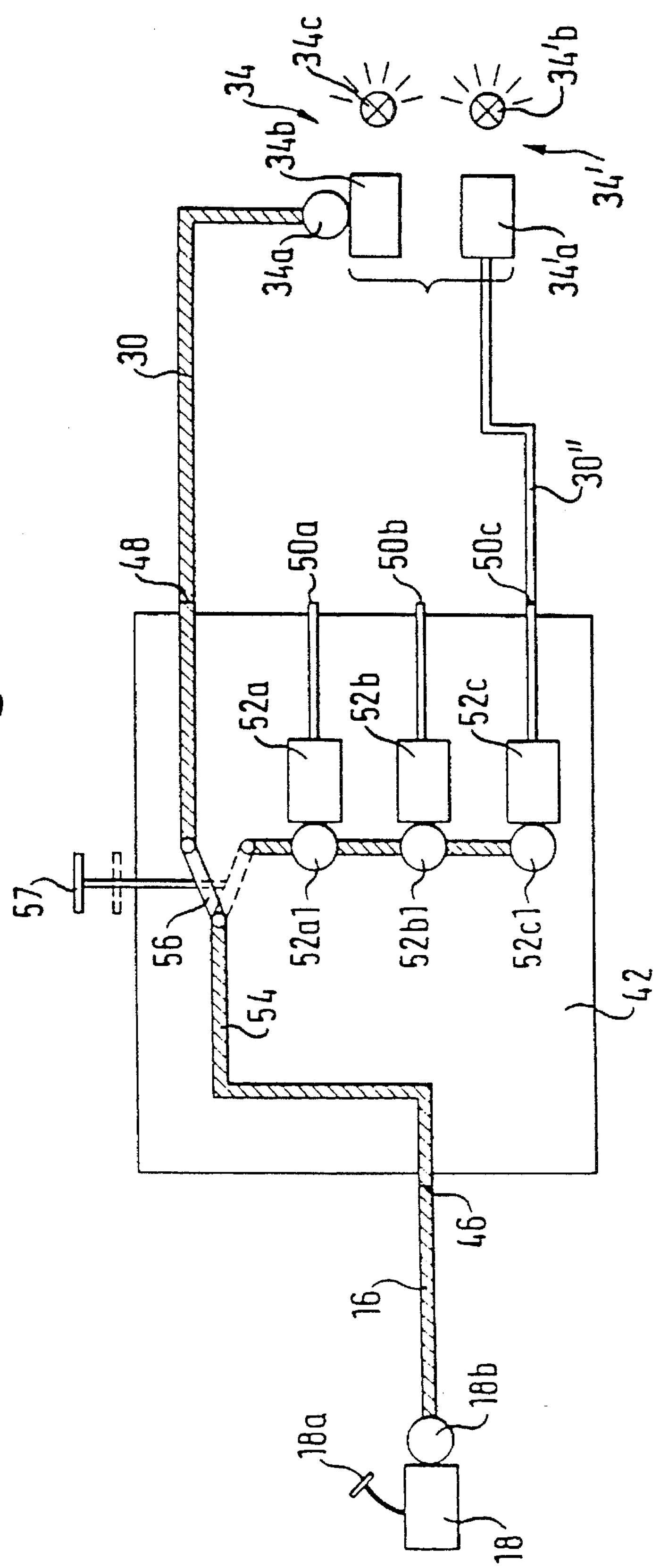

A first embodiment of a data converter 42 is shown in FIG. 2, such as is preferably employed in the tractor vehicle in accordance with FIG. 1. On the side towards the tractor vehicle (to the left in the drawing), the data converter 42 is provided with a data bus output 46 and on the side towards the trailer vehicle with a data bus output 48 and single line outputs **50*a*, 50*b* and 50*c*, so that it can be connected not only with the data bus function units, such as the brake light 34, but also with single line function units such as the brake light 34', as indicated in FIG. 2** by a curly bracket.

For converting data from data bus signal form to single line signal form and vice versa, data converters **52*a*, 52*b* or 52*c* are assigned to each of the single line outputs 50*a*, 50*b* and 50*c*. The data converters 52*a*, 52*b* and 52*c* are each connected via a data bus line junction 52*a*1, 52*b*1 or 52*c*1 with a data bus line 54 of the data converter 42. The data converter furthermore has a switch 56 with an actuation element 57 so as to be able to switch the internal data bus line 54 on the trailer side between the data bus output 48 and the single line outputs 50*a*, 50*b* and 50*c***.

Although in the exemplary embodiment shown in FIG. 2 the switch 56 is embodied as a manually operable switch, it is also conceivable in principle to provide an electronic switch. For this purpose a test line (not shown) can be provided for example, by means of which it can be determined in the course of connecting the two transmission systems of which type the two partial vehicles are. As a result of this determination it is then possible to switch between the connection to the data bus transmission system and the connection to the single line transmission system electronically. The test line does not necessarily have to be a physical line. It is also conceivable to send a test signal via a data bus line by means of which the combination of the vehicle section can be determined.

In the position of the switch 56 indicated in FIG. 2 by solid lines, the data converter 42 is set for the transmission of data between a data bus transmission system on the tractor side with a data bus line 16 and a data bus transmission system on the trailer side with a data bus line 30.

When actuating a brake pedal 18a, the brake pedal unit 18 generates a brake signal corresponding to this actuation. This is subsequently sent in the form of brake control data to various function units, for example the brake system 20 on the tractor side, the brake light 22 on the tractor side, the brake system 32 on the trailer side and the brake light 34 on the trailer side (see FIG. 1). For sending the brake signal to the brake light 34 on the trailer, the brake pedal unit 18 transmits, via a data bus junction **18*b* assigned to it, a data packet consisting of the address data of the brake light 34 and the brake control data to the data bus line 16/54/30**.

The brake light or, more exactly, the brake light unit 34 has a line junction **34*a* assigned, which checks all data packets transmitted via the data bus line 16/54/30 to determine whether or not they contain the address of the brake light unit 34 in the form of address data. If the junction 34*a* determines that the address of the brake light unit is contained in a data packet, it transfers the control data contained in this data packet to a processing unit 34*b* of the brake light unit 34. The processing unit 34*b* then performs a process corresponding to the control data, for example it switches a bulb 34*c*** on, so that the brake operation is visually signaled to the driver of a following vehicle.

If, however, the semi-trailer 24' equipped with the single line transmission system is connected with the tractor vehicle 12, the switch 56 of the data converter 42 must be placed into the position shown by dashed lines in FIG. 2, where the data bus output 46 on the tractor side is connected with the single line outputs **50*a*, 50*b* and 50*c* on the trailer side. The brake light unit 34' of the semi-trailer 24' is connected via the signal line 30" to the single line output 50*c* which is the bottom-most in FIG. 2**.

Now, if a brake signal data packet destined for the brake light unit 34' is transmitted by the brake pedal unit 18 to the data bus line 16, the junction **52*c*1 recognizes the address signal of the brake light unit 34' contained in this data packet. It subsequently passes on the brake control data also contained in the data packet to the data converter 52*c*, which converts them from the data bus signal form to the single line signal form and passes on the converted brake control data via the single line signal line 30" to a processing unit 34'*a* of the brake light unit 34'. Upon receipt of the control data, the processing unit 34'*a* performs a process corresponding to the control data, for example it switches on a bulb 34'*b***, so that the brake operation is visually signaled to the driver of a following vehicle.

Figure 3:
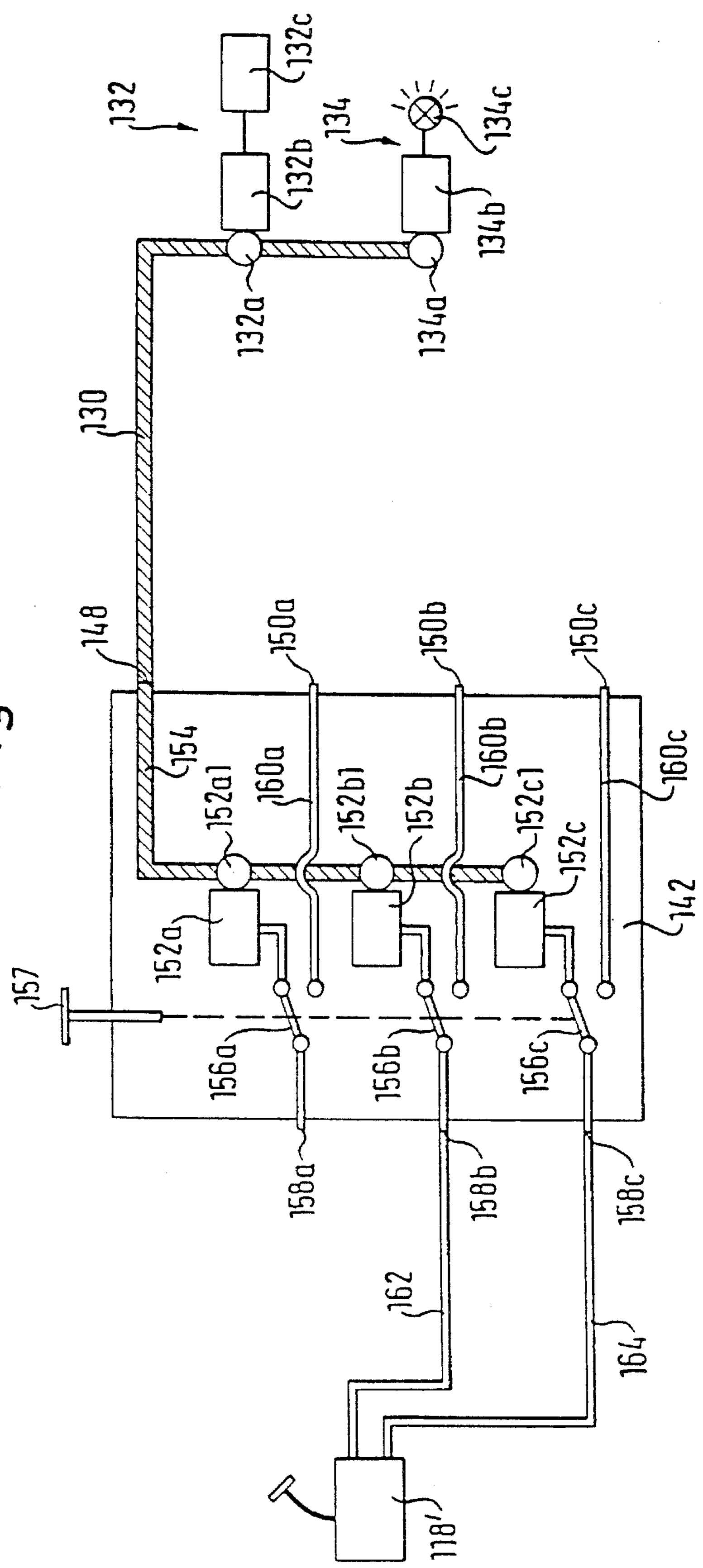

A further embodiment of a data converter is shown in FIG. 3, which differs from the embodiment shown in FIG. 2 in that outputs for connection with a single line transmission system are provided on the tractor side. Analogous parts have been given the same references number in FIG. 3 as in FIG. 2, only increased by the number 100.

On the tractor side, the data converter 142 in accordance with FIG. 3 has single line outputs **158*a*, 158*b* and 158*c* and, on the trailer side, a data bus output 148 as well as single line outputs 150*a*, 150*b* and 150*c*. A switch 156*a*, 156*b* or 156*c* is associated with each of the single line outputs 158*a*, 158*b* and 158*c*, by means of which the respective output 158*a*, 158*b* or 158*c* can be connected either with an associated data converter 152*a*, 152*b* or 152*c* or via a single line signal line 160*a*, 160*b* or 160*c* directly with the associated output 150*a*, 150*b* or 150*c*. The data converters 152*a*, 152*b* and 152*c* are each connected via a data bus junction 152*a*1, 152*b*1 or 152*c*1 with a data bus signal line 154 leading to the data bus output 148 on the trailer side. The switches 156*a*, 156*b* and 156*c* can be operated by means of a common actuation element 157**.

The data converter 142 is particularly suited for fixed attachment to a tractor vehicle equipped with a single line transmission system. In a tractor vehicle of this type the brake pedal unit 118' is provided with a plurality of single line control lines, for example with a control line 162 for the brake system unit 132 on the trailer side and a control line 164 for the brake light unit 134 on the trailer side. When connecting this tractor vehicle with a trailer vehicle equipped with a data bus transmission system and, as a result of this, with the switches **156*a*, 156*b* and 156*c* in the position in accordance with the view in FIG. 3, the control signal intended for the brake system unit 132 is supplied to the data converter 152*b* via the line 162. It converts the control signal to data bus signal data and places the address data of the brake system unit 132 ahead of them. The data packet formed in this way is then sent to the data bus line 154 via the junction 152*b*1. The control data destined for the brake light unit 134 are sent via the line 164 to the data converter 152*c* in an analogous manner, are converted by it to the data bus signal form and are sent from the junction 152*c*1 in the form of a data packet provided with the address of the brake light unit 132 to the data bus line 154**.

If the junction **132*a* of the brake system unit 132 recognizes the address of the brake system unit in a transmitted signal, it passes the associated control signal to the processing unit 132*b* which thereupon triggers a process of the brake system 132*c*** corresponding to the control data, for example, it closes a shuttle valve of a compressed air brake system.

If the junction **134*a* of the brake light unit 134 recognizes the address of the brake light unit in a transmitted signal, it passes the associated control data on to the processing unit 134*b*, which thereupon triggers a process of the bulb 134*c*** corresponding to the control data, for instance turns it on.

The above described data converters 42 and 142 are suitable for fixed installation on one of the partial vehicles, preferably the tractor vehicle. Fixed installation is of particular advantage as long as it is frequently intended to connect tractor and trailer vehicles equipped with different transmission systems, i.e. as long as the data bus transmission system has not yet been introduced predominantly in the marketplace, because it makes frequent use and removal of the data converter superfluous.

Figure 4:
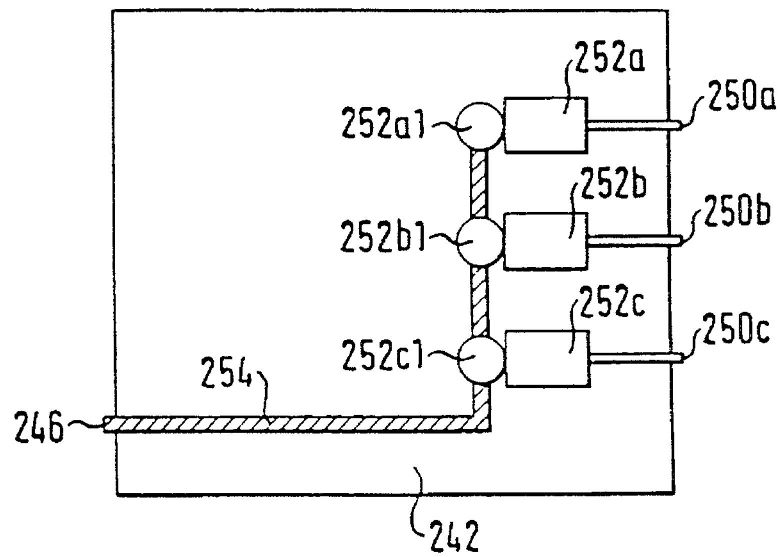

A further embodiment of a data converter is illustrated in FIG. 4, which essentially corresponds to the embodiment in accordance with FIG. 2. Therefore analogous parts have been given the same reference numerals as in FIG. 2, only increased by the number 200.

On the tractor side the data converter 242 has a data bus output 246 and on the trailer side single line outputs **250*a*, 250*b* and 250*c*. A data converter 252*a*, 252*b* or 252*c* with associated data bus line junctions 252*a*1, 252*b*1 and 252*c*1 is assigned to the respective single line outputs 252*a*, 252*b* or 252*c*. The junctions 252*a*1, 252*b*1 and 252*c*1 are connected via a data bus line 254 with the data bus output 246** on the tractor side.

If required, i.e. when connecting a tractor vehicle with a data bus transmission system and a trailer vehicle with a single line transmission system, the data converter 242 can be inserted at the connecting point between the two transmission systems. However, when coupling a tractor vehicle with a trailer vehicle where both are equipped with the same transmission system, the data converter 242 is not inserted and is housed somewhere else, preferably on the tractor vehicle. Reference is made to the previously described embodiments regarding the operation and function of the data converter 242.

The simply constructed and therefore cost-efficient data converter 242 is of particular advantage after the data bus transmission system has achieved market penetration, because then tractor and trailer vehicles equipped with different transmission systems will only rarely meet. As long as only a very few tractor vehicles are equipped with the data bus transmission system, the use of a data converter which is provided with single line outputs on the tractor side and with a data bus output on the trailer side is conceivable.

Figure 5:
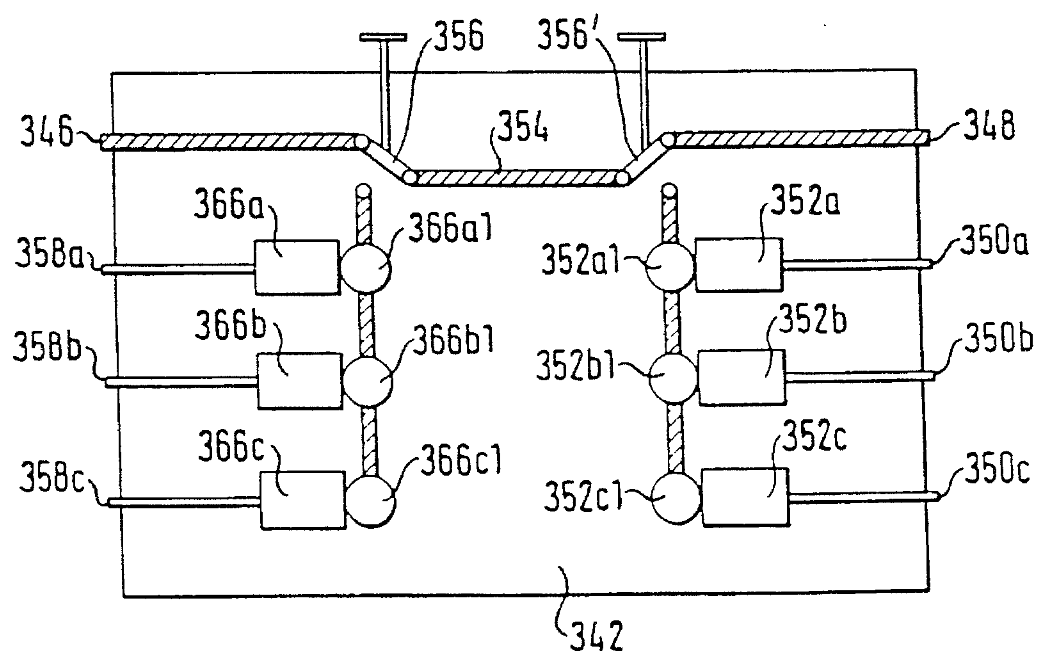

A further embodiment of a data converter is shown in FIG. 5, which essentially corresponds to the embodiment in accordance with FIG. 2. Therefore analogous parts have been given the same reference numerals as in FIG. 2, only increased by the number 300.

The data converter 342 is embodied on the tractor side with a data bus output 346 and single line outputs **358*a*, 358*b* and 358*c* and on the trailer side with a data bus output 348 and single line outputs 350*a*, 350*b* and 350*c*. Data converters 366*a*, 366*b* and 366*c* are assigned to the respective single line outputs 358*a*, 358*b* and 358*c* on the tractor side and are connected via associated data bus line junctions 366*a*1, 366*b*1 and 366*c*1 with a data bus line 354 of the data converter 342. Data converters 352*a*, 352*b* or 352*c* are analogously respectively assigned to the single line outputs 350*a*, 350*b* and 350*c* on the trailer side and are connected via associated data bus line junctions 352*a*1, 352*b*1 and 352*c*1 with the data bus line 354. Furthermore a switch 356 on the tractor side and a switch 356' on the trailer side are provided for switching between the data bus 346 on the tractor side and the single line outputs 358*a*, 358*b* and 358*c* on the tractor side or between the data bus output 348 on the trailer side and the single line outputs 350*a*, 350*b* and 250*c* on the trailer side. Reference is made to the previously described embodiments regarding the operation and function of the data converter 342**.

The data converter 342 can be used with tractor and trailer vehicles with arbitrary combinations of data bus transmission systems and single line transmission systems. It can be mounted fixedly on one of the partial vehicles or can be inserted, if needed. Thus the data converter 342 can be universally used.

It is also possible in principle to embody the above described data converters without a switch for switching between the data bus output and the single line outputs. But for preventing duplications and superimpositions of the data to be transmitted, it is then necessary to assure that data are taken only from the data bus output or only from the single line outputs and supplied to the respective function units. It could be possible that a data converter on the tractor side which is equipped with both output types at the trailer side is connected with a data converter on the trailer side which is equipped with both output types on the tractor side. In this case the function units would be supplied with data transmitted via the data bus outputs of the data converter as well as via the data transmitted via the single line outputs for processing, which would result in data duplication and superimpositions.

A multiple coupling 68 with a multiple coupling half **68*a* on the tractor side and a multiple coupling half 68*b* on the trailer side is shown in FIG. 6**, which is used for the virtually simultaneous connection of a plurality of supply lines on the tractor and the trailer side.

In accordance with FIG. 6, two compressed air lines **70*a*1 and 70*a*2 on the tractor side, for example, are brought to the associated line coupling halves 72*a*1 and 72*a*2, which are fixedly disposed in the multiple coupling half 68*a*. Correspondingly, compressed air lines 70*b*1 and 70*b*2 on the trailer side are brought to the associated line coupling halves 72*b*1 and 72*b*2, which are fixedly disposed in the multiple coupling half 68*b*. The line coupling halves 72*a*1 and 72*b*1 or 72*a*2 and 72*b*2 can be connected with each other for the operational connection of the lines 70*a*1 and 70*b*1 or 70*a*2 and 70*b*2. Furthermore, an electrical coupling half 72*a*3 is fixedly disposed on the multiple coupling half 68*a*, to which a data bus control line 70*a*3 and an electrical supply line 70*a*4 are brought and an electrical coupling half 72*b*3 is fixedly disposed on the multiple coupling half 68*b*, to which single line control lines 70*b*3 and an electrical supply line 70*b*4** are brought.

To make the connecting process of the two multiple coupling halves **68*a* and 68*b* easier, which requires a higher total force effort because of the build-up of the required individual coupling forces and possibly additionally required force because of twisting or the like of the line coupling halves, the multiple coupling 68 is equipped with a power device 74, the function of which will be explained in detail further down below by means of FIG. 7 to 9**.

A first possibility for connecting the multiple coupling halves to the respective vehicle sections 12 and 14 is schematically illustrated in FIG. 10, where analogous parts are provided with the same reference numerals as in FIG. 6, but increased by the number 400. Showing of a power device has been omitted in FIG. 10 for reasons of clarity of the drawing.

The multiple coupling 468 differs from the multiple coupling 68 only in that in addition to the control line **470*a*3 on the tractor side, the control line 470*b*3** on the trailer side is also embodied as a data bus control line.

The flexible supply lines **470*a*1–470*a*4 (shown in dashed lines in FIG. 10) on the tractor side are fixedly connected with one of their ends with respectively associated line coupling halves 472*a*1–472*a*3 which, in turn, are fixedly disposed on the multiple coupling half 468*a* on the tractor side. The supply lines are connected via their other ends with associated individual quick-release connectors 471*a*1–471*a*3. The individual quick-release connectors 471*a*1–471*a*3 can be connected with individual connectors 469*a*1–469*a*3, which have already conventionally been disposed on the tractor vehicle 12 and are supplied from a central supply unit 467 disposed on the tractor vehicle 12. Although a single central supply unit 467 for supplying the compressed air lines 470*a*1 and 470*a*2 with compressed air as well as the control line 470*a*3 with control signals as well as the current supply line 470*a*4 with current is shown in FIG. 10**, it is possible to provide a plurality of separate supply units.

The flexible supply lines **470*b*1–470*b*4 (shown in dashed lines in FIG. 10) on the trailer side are fixedly connected with one of their ends with respectively associated line coupling halves 472*b*1–472*b*3 which, in turn, are fixedly disposed on the multiple coupling half 468*b*. The supply lines are connected via their other ends with associated individual quick-release connectors 473*b*1–473*b*3. The individual quick-release connectors 473*b*1–473*b*3 can be connected with individual connectors 475*b*1–475*b*3, which have already conventionally been disposed on the trailer vehicle 24 and by which the function units on the trailer side (not shown) are served with either compressed air, current or control signals, The individual connectors 469*a*1–469*a*3 form a group $G_{11}$ of tractor-side line connecting halves, the individual connectors 475*b*1–475*b*3 form a group $G_{12}$ of trailer-side line connecting halves, the line coupling halves 472*a*1–472*a*3 form a group $G_{21}$ of tractor-side line coupling halves, and the line coupling halves 472*b*1–472*b*3** form a group $G_{22}$ of trailer-side line coupling halves.

Between the individual quick-release connectors **471*a*1–471*a*3 and 473*b*1–473*b*3 and the associated one of the individual connectors 469*a*1–469*a*3 and 475*b*1–475*b*3, releasable locking means K are provided which secure after the coupling of a pair 471*a*1/469*a*1–471*a*3/469*a*3, 473*b*1/475*b*1–473*b*3/475*b*3 of an individual quick connector and an individual connector this pair against unintended uncoupling. For the sake of a more distinct representation in FIG. 10, only the pair 471*a*3/469*a*3 is shown with such locking means in the form of a dashed bracket K; analogous locking means are however provided for each of the other pairs 471*a*1/469*a*1, 471*a*2/469*a*2, 473*b*1/475*b*1–473*b*3/475*b*3**.

Between line coupling halves **472*a*1/472*b*1–472*a*3/472*b*3 associated with each other, no locking means are provided which correspond to the locking means K. The pairs 472*a*1/472*b*1–472*a*3/472*b*3 of line coupling halves are held together and secured against unintended uncoupling by a common power device 474 rough-schematically shown in FIG. 10, which power device has a tractor-side force engagement element 474*a* and a trailer-side force engagement element 474*b***.

The multiple coupling half **468*b* is fixedly retained in a mount 496 fixedly attached to the trailer vehicle 24. The mount 496 is equipped with a cover 496*a* (indicated schematically by a dot-dashed line in FIG. 10), which covers the multiple coupling half 468*b* and protects it from the effects of weather and dirt when it is not connected to the multiple coupling half 468*a* on the tractor side. For this purpose the cover 496*a* is preferably prestressed to take up the cover position described above, so that when the two multiple coupling halves 468*a* and 468*b*** are separated, it is automatically transferred into the cover position.

A stowage mount 498 is fixedly attached to the tractor vehicle 12, in which the multiple coupling half **468*a* on the tractor side can be stowed after having been separated from the multiple coupling half 468*b* on the trailer side. The stowage mount 498 is preferably embodied in such a way that the multiple coupling half 468*a* can be locked together with it via the power device (corresponding to the power device 74 of FIG. 6). The stowage mount 498 furthermore is equipped with sealing means (not shown), for example a rubber gasket, so that in the above described locked stowage position the multiple coupling half 468*a*** is protected against the effects of weather and dirt.

To connect the two multiple coupling halves **468*a* and 468*b* in the coupled state of the truck and trailer 12/24, an operator first takes the multiple coupling half 468*a* on the tractor side out of the stowage mount 498 and manually brings it close to the multiple coupling half 468*b* on the trailer side. He then removes the cover 496***a* from the multiple coupling half 468*b* on the trailer side. He finally brings the two multiple coupling halves together and locks them together with the aid of the power device. To separate the two multiple coupling halves, the operator undoes their lock with the aid of the power device, separates the two multiple coupling halves and locks the multiple coupling half 468*a* on the tractor side in the stowage mount 498. In the course of this the cover 496*a* is automatically placed into the covering position.

With the aid of the embodiment shown in FIG. 10 it is possible to retrofit a conventional truck and trailer in a simple manner with a multiple coupling half, where the connection between the tractor vehicle 12 and the trailer vehicle 24 is made by means of flexible supply lines provided with individual quick-release connectors which are brought directly from the individual connectors 469*a*1–469*a*3 on the tractor side to the individual connectors 475*b*1–475*b*3 on the trailer side.

For retrofitting it is only necessary to attach a retrofitting set on the tractor side, comprising the stowage mount 498, the multiple coupling half 468*a* on the tractor side end the supply lines 470*a*1–470*a*4 with plug connectors 471*a*1 471*a*3 and 472*a*1–472*a*3, and a retrofitting set on the trailer side, comprising the mount 496, the multiple coupling half 468*b* on the trailer side and the supply lines 470*b*1–470*b*3 with the plug connectors 473*b*1–473*b*3 and 472*b*1–472*b*3, on the tractor vehicle 12 or the trailer vehicle 24. After removal of the conventional supply lines H, of which FIG. 10 shows only that one associated with the individual connectors 469*a*3 and 475*b*3, one can connect the individual quick-release connectors 471*a*1–471*a*3 or 473*b*1–473*b*3, respectively, with the individual connectors 469*a*1–469*a*3 of the tractor vehicle 12, or 475*b*1–475*b*3 of the trailer vehicle 24. It is of course also possible to retrofit only one of the vehicle sections with a multiple coupling half.

If a retrofitted tractor vehicle 12 meets a trailer vehicle which was not retrofitted, the multiple coupling half 468*a* can be stowed in the stowage mount 498 and locked. So that the tractor and the trailer vehicle can now be connected via conventional supply lines H, it is only necessary to separate the individual quick release connectors 471*a*1–471*a*3 from the individual connectors 469*a*1–469*a*3 on the tractor side. When a tractor vehicle which was not retrofitted meets a retrofitted trailer vehicle, an analogous operation is performed.

Thus, the above described embodiment of the multiple coupling is distinguished not only the simplicity of retrofitting, but also by compatibility with conventional coupling systems for supply lines.

A further possibility for connecting the multiple coupling halves with the respective partial vehicles 12 and 24 is schematically illustrated in FIG. 11, where analogous parts are provided with the same reference numerals as in FIG. 6, but increased by the number 500. The example embodiment of FIG. 11 will be described hereinafter only as far as it differs from the example embodiment of FIG. 10. Otherwise, reference should be had to the example embodiment of FIG. 10.

In the multiple coupling 568 illustrated in FIG. 11, the line coupling halves 572*a*1–572*a*3 disposed on the multiple coupling half 568*a* are embodied as plug connectors on the tractor side, too. The supply lines 570*a*1–570*a*3 on the tractor side are provided on the trailer side with individual quick release connectors 565*a*1–565*a*3, which can be connected with the line coupling halves 572*a*1–572*a*3 on the tractor side, and are directly connected on the tractor side to the central supply unit 567. In addition, the individual connectors 569*a*1–569*a*3 are connected with the central supply unit 567. The supply lines 570*b*1–570*b*3 on the trailer side are connected on the tractor side with line coupling halves 572*b*1–572*b*3 disposed in the multiple coupling half 568*b* on the trailer side and terminate on the trailer side in supply lines 577*b*1–577*b*3, which lead from the additionally provided individual connectors 575*b*1–575*b*3 to function units (not shown) of the trailer vehicle 24.

It is also possible to connect the individual quick-release connectors 565*a*1–565*a*3 directly with the individual connectors 575*b*1–575*b*3.

Since additional individual connectors 568*a* 1–568*a*3 or 575*a*1–575*a*3 are provided on the tractor vehicle 12 as well as the trailer vehicle 24, it has also been assured in the embodiment in accordance with FIG. 11 that the two retrofitted partial vehicles 12 and 24 can also be connected with partial vehicles which are not retrofitted. In this case it is only necessary to lead conventional supply lines H from the partial vehicle which is not retrofitted to the individual connectors 569*a*1–569*a*3 or 575*b*1–575*b*3, respectively. When according to FIG. 11 a tractor vehicle 12 meets a trailer vehicle 24, the individual quick release connectors 565*a*1–565*a*3 may alternatively be connected directly with the individual connectors 575*b*1–575*b*3.

In a further variant (not shown) it is also conceivable to lead the supply lines 570*a*1–570*a*3, which are directly connected to the central supply unit 567, directly to the line coupling halves 572*a*1–572*a*3, omitting the individual quick connectors 565*a*1–565*a*3.

In accordance with FIG. 6, a data converter 42' is disposed in the line coupling half 70*a*3 on the tractor side, which preferably has a design as explained above by means of FIG. 2. Therefore the line coupling half 70*a*3 has a connecting element identified by a circular symbol in FIG. 6 for the data bus output 48 on the trailer side and a connecting element identified by a triangular symbol in FIG. 6 for the single line outputs 50 on the trailer side. In contrast thereto, the line coupling half 70*b*3 on the trailer side has only a connecting element for single line control lines, which is identified in FIG. 6 with a triangular symbol.

The connecting elements for the data bus control line and the single line control lines are embodied in different shapes, as indicated in a rough diagram in FIG. 6 by means of a circular symbol for the data bus control line and a triangular symbol for the single line control lines. Because of this, in the course of connecting a single line control element of a trailer with the line coupling half 70*a*3 there is no possibility of mistaken wrong connections of a data bus transmission system with a single line transmission system.

The disposition of the data converter 42' in the line coupling half 70*a*3 of the multiple coupling half has the advantage that it is not necessary, for connection downstream of the data converter, to bring separate lines for the data bus transmission system and the single line transmission system to the trailer vehicle, as shown in FIG. 1, but that the data converter can be disposed directly at the interface between tractor vehicle and trailer vehicle.

The structure of the power device 74 will be described in detail below by means of FIGS. 7 to 9.

The power device 74 comprises a force engagement element 74*b* on the trailer side, which is substantially cylindrical and is inserted into a recess 76 of the multiple coupling half 68*b* on the trailer side. The force engagement element 74*b* is provided with a radially protruding annular flange 74*b*1 on its right end as shown in FIG. 7, with which it rests against the multiple coupling half 68*b* in the inserted state. An annular groove **74*b*3 is furthermore formed in a cylindrical exterior surface 74*b*2, into which a snap ring 78 can be inserted in such a way that the multiple coupling half 68*b* is clamped between the snap ring 78 and the annular flange 74*b*1 and thus the force engagement element 74*b* is firmly maintained on the multiple coupling half 68*b*. On its end remote from the annular flange 74*b*1, the force engagement element 74*b* is embodied with an undercut recess 74*b*4**.

In addition, the power device 74 comprises a force engagement element **74*a* on the tractor side, having a substantially cylinder-shaped control element 80, which has a conically widened section 80*a* on its side facing the force engagement element 74*a*. The force engagement element 74*a* is fastened on the multiple coupling half 68*a* via a radial flange 84*a* of the mounting element 84**, for example screwed to it.

The control element 80 is seated, displaceable in its longitudinal direction A, in a longitudinal bore **82*d* of a guide element 82, which in turn is received, longitudinally displaceable in the direction A, in a mounting element 84**.

The guide element 82 has a section **82*a* with a larger diameter and a section 82*b* with a smaller diameter, which form a shoulder section 82*c* between them. A helical pressure spring 86, which is supported on one end on an end part 88 screwed into the mounting element 84 and on the other end on the guide element 82, prestresses the guide element 82 towards the right in FIG. 6 into an abutting position, in which it rests with the shoulder section 82*c* against an inner radial flange 84*b***.

The longitudinal bore **82*d* of the guide element 82 is conically widened on its side facing the force engagement element 74*b* in a manner corresponding to the control element 80. Radial bores 82*e* are formed in the area of the conical widening of the guide element 82, in which spheres 90 are guided as pull engagement bodies. The radial bores 83*e* are slightly radially narrowed on the outside, so that the spheres 90 can partially protrude out of the radial bores 83*e*, but cannot fall out. A movement of the spheres 90 radially towards the interior is limited by the exterior peripheral surface of the control element 80**.

The force engagement element **74*a* further includes an actuation element 92 with a lever 92*a*, by means of which the movement of the control element in the direction A can be controlled. The actuation element 92 is pivotable around an axis B extending orthogonally in respect to the drawing plane of FIG. 7 and comprises an actuation cam 92*b* which acts via a force transfer device 94 on the control element 80 in such a way, that a larger actuation path of the actuation element 92 results in a smaller displacement path of the control element 80 in respect to the mounting element 84**.

To connect the multiple coupling halves **68*a* and 68*b*, starting from their uncoupled position shown in FIG. 7, first the control element 80 and the guide element 82 are introduced into the recess 74*b*4 of the force engagement element 74*b*. Then the actuation element 92 is pivoted counterclockwise in FIG. 7, because of which the control element 80 is moved by means of the force transfer device 94 towards the left in FIG. 7 in the direction A. Because of this movement, the conically widened section 80*a* of the control element 80 is introduced into the conical widening of the longitudinal bore 82*d*, in the course of which the spheres 90 are pushed radially outward out of the radial bores 83*e* by the exterior peripheral surface of the conical section 80*a*** acting as control surface.

Once the control element 80 in the position in accordance with FIG. 8 has been completely drawn into the guide element 82, the spheres 90 grip the undercut of the recess **74*b*4 of the force engagement element 74 from behind and represent a force transfer engagement between the force engagement elements 74*a* and 74*b*. In this position the multiple coupling halves 68*a* and 68*b*** are in their preparatory coupling state.

In the course of continued pivoting of the actuation element 92 in a counterclockwise direction in FIG. 8, the control element 80 is moved further to the left in FIG. 8. During this movement the control element 80, because the exterior peripheral surface of its conical section **80*a* rests against the interior surface of the conical widening of the guide element 82, takes the guide element 82 along against the force of the spring 86. Furthermore, during this movement, because of the force transfer engagement via the spheres 90, the force engagement elements 74*a* and 74*b* are pulled against each other to produce the coupling state of the multiple coupling halves 68*a* and 68*b* shown in FIG. 9**.

Once the actuation element 92 has reached its position shown in FIG. 9, a securing pin **92*c* (see FIG. 6), guided in the lever 92*a* by means of a prestressing force of a securing spring (not shown), enters into a securing recess 84*c* formed in the mounting element 84. Together, the securing pin 92*c*, the spring (not shown) and the securing recess 84*c* form securing means which secure the lever 92*a* against inadvertent pivoting out of the position shown in FIG. 9 and thus secure the two multiple coupling halves 68*a* and 68*b*** in their coupled state.

For separating the multiple coupling halves **68*a* and 68*b*, starting with the secured coupled position of the multiple coupling halves 68*a* and 68*b* in accordance with FIG. 9, the securing pin 92*c* is pulled out of the securing recess 84*c* against the force of the securing spring (not shown) (FIG. 6). Then the actuating element 92 is pivoted in a clockwise direction in FIG. 9, because of which the control element 80 is moved to the right in FIG. 9. In the course of this the guide element 82 is pushed to the right by the force of the spring 86. The spring 86 must be of such a size that the force transfer engagement between the force engagement elements 74*a* and 74*b*** is always assuredly maintained during this movement.

Once the guide element 82 has reached its stop position in accordance with FIG. 8, with continued pivoting of the actuation element 92 in a clockwise direction in FIG. 8 the conical section **80*a* of the control element 80 is moved out of the conical widening of the longitudinal bore 82*d*. Because of this the spheres 90 can pull back again into the radial bore 80*e*, so that the force transfer engagement of the force engagement elements 74*a* and 74*b* is cancelled and the multiple coupling halves can again be returned into the uncoupled position in accordance with FIG. 7**.

FIG. 13 shows a further embodiment of a multiple coupling 68 which corresponds substantially to the embodiment of FIG. 6. Analogous parts are therefore designated by the same reference numerals used in FIG. 6. The embodiment according to FIG. 13 will be described hereinafter only as far as it differs from the embodiment of FIG. 6. Otherwise, reference is expressly made to the description of the embodiment of FIG. 6.

The two multiple coupling halves **68*a* and 68*b* according to the embodiment of FIG. 13 are provided with a projection 68*a*1 or 68*b*1, respectively, which extends along the peripheral edges 68*a*2 or 68*b*2, respectively, of their base plates 68*a*3 or 68*b*3, respectively. The projections 68*a*1 and 68*b*1 face each other when the multiple coupling halves approach each other for common coupling. On the projection 68*a*1 of the multiple coupling half 68*a* on the tractor side, there is provided a sealing means 63, e.e. a rubber packing washer, schematically represented in FIG. 13 in the form of a triangle. This sealing means 63 formed as a compression sealing gets by the coupling approach movement of the two multiple coupling halves necessarily into sealing engagement with the projection 68*b*1 of the multiple coupling half on the trailer side. In the coupled state of the multiple coupling halves 68*a* and 68*b*, the sealing 63 abuts against the projection 68*b*1 on the trailer side and thus protects the space R between the multiple coupling halves 68*a* and 68*b*** from climatic influences, especially from humidity.

Principally, the attachment of the rubber sealing 63 to the multiple coupling half **68*b* on the trailer side is conceivable; however, the attachment of the rubber sealing being a functionally important and thus valuable part to the multiple coupling half 68*a*** on the tractor side is preferred.

Furthermore, pilot bars **61*a* are provided on the multiple coupling half 68*a* on the tractor side, which engage passages 61*b* in the multiple coupling half 68*b* on the trailer side when the two multiple coupling halves 68*a* and 68*b* are coupled, before the other respective coupling halves 72*a*1 and 72*b*1, 72*a*2 and 72*b*2 etc. on the tractor and trailer sides are engaging each other. The pilot bars 61*a* and passages 61*b* thus effect prior to the actual coupling process a reliable prepositioning of the multiple coupling halves 68*a* and 68*b*** relative to each other.

The line coupling halves **72*a*1, 72*a*2, 72*a*3 or 72*b*1, 72*b*2, 72*b*3, respectively, are releasably attached to the respectively associated carrier plates 68*a*3 or 68*b*3 of the multiple coupling halves 68*a* and 68*b*. Analogously, also the force engagement element 74*a* on the tractor side and the force engagement element 74*b* on the trailer side are releasably attached in the moving device 74 to the carrier plates 68*a*3 or 68*b*3. The respective attachment points are impervious, especially waterproof; then, with the line coupling halves 72*a*1–72*a*3, 72*b*1–72*b*3 special care is taken that also the connections to the lines 70*a*1–70*a*4, 70*b*1–70*b*4 are impervious, especially water-proof. Accordingly, the engagement member 74*b* on the trailer side is covered by a cover cap 59. Finally, also the pairs of pilot bars 61*a* and passages 61*b* are made impervious, particularly waterproof, by the use of a cover stopper 61*b*1; also the carrier plates 68*a*3 and 68*b*3** are impervious, especially waterproof.

With reference to FIGS. 15 to 18, the construction and the function of the power device 74 or of the moving device 74 will be described hereinafter in detail. The moving device 74 comprises a force engagement element **74*b* on the trailer side which is substantially cylindrical and which is inserted into a recess 76 in the multiple coupling half 68*b* on the trailer side. At its right-hand end portion in FIG. 15, the force engagement element 74*b* has a radially outwardly projecting annular flange 74*b*1 and abuts therewith against the multiple coupling half 68*b* when being inserted in the recess 76. Furthermore, an annular groove 74*b*3 is provided in a cylindrical outer face 74*b*2, into which annular groove a snap ring 78 can be inserted such that the multiple coupling half 68*b* is clamped between the snap ring 78 and the annular flange 74*b*1 and thus the passive mover element 74*b* is releasably fixed to the multiple coupling half 78*b***.

Within the region of the force engagement element end portion which is remote from the annular flange **74*b*1, an annular groove 74*b*5 is defined in an inner circumferential face 74*b*4 of this element. Furthermore, the inner circumferential face 74*b*4 comprises between the annular groove 74*b*5 and the element end portion associated with the annular flange 74*b*1 a radially inwardly projecting annular flange 7868 which is located adjacent the annular groove 74*b*5**.

The moving device 74 comprises further a force engagement element **74*a* on the tractor side with an active mover element 82 and a substantially cylindrical control element 80 associated with the mover element. The force engagement element 74*a* is releasably fixed, e.g. screwed to the multiple coupling half 68*a* through a radial flange 84*a* of a holding element 84**.

The control element 80 is longitudinally displaceably supported in its length sense (direction of arrows A and A') in a longitudinal passage **82*d* of the active mover element 82 which is longitudinally displaceably received in the holding element 84 in the direction of the arrows A and A'. The active mover element 82 includes a section 82*a* of larger diameter and a section 82*b* of smaller diameter, these diameters defining between each other a shoulder section 82*c*. A helical compression spring 86 abutting with one end against an end member 88 screwed into the holding element 84 and with the other end against the active mover element 82 biases the active mover element 82 in FIG. 15 to the right side into a stop or resting position to abut with the shoulder section 82*c* against an inner radial flange 84*b***.

At its side facing the force engagement element **74*b*, the control element 80 includes a conically enlarged section 80*a*. At its side facing the force engagement element 74*b*, the longitudinal passage 82*b* of the active mover element 82 is conically enlarged corresponding to the conical section 80*a* of the control element 80 as shown at 82*g*. Within the region of the conical enlargement 82*g* of the active mover element 82, radial bores 83*e* are provided wherein balls 90 are guided as active motion transmitting means. The radial bores 82*b* are radially outwardly a bit narrowed so that the balls 90 partially protrude from the radial bores 83*e* but cannot fall out therefrom. A radially inward movement of the balls 90 is limited by the circumferential face of the control element 80**.

The force engagement element **74*a* comprises furthermore an actuating mechanism 92 or drive means 92, respectively, with an actuating lever 92*a* which is pivotable about an axis B extending orthogonally with respect to the drawing plane of FIG. 15. The pivoting movement of the actuating lever 92*a* about the axis B in the direction of the arrows C or C' is translated by means of a transmission mechanism 94** into a movement of the control element in the direction of the arrows A or A', respectively.

The actuating lever **92*a* is coupled with a worm gear 94*a* whose axis extends substantially parallel to the pivot axis B and is pivotally supported by the holding element 84. The worm gear 94*a* meshes with a gear wheel 94*b* which is connected with a bevel gear 94*d* via a shaft 94*c* pivoted to the holding element 84. The bevel gear 94*d* meshes with a further bevel gear 94*e* which is again connected with a gear wheel 94*g* via a shaft 94*f* pivoted to the holding element 84. Finally, the gear wheel 94*g* meshes with a gear rack element 94*h* which extends in the direction of the arrows A or A' and which is fixed to the control element 80 or is integral therewith. The worm gear 94*a*, the gear wheel 94*b*, the bevel gears 94*d* and 94*e*, the gear wheel 94*g* and the gear track element 94*h* form together the transmission mechanism 94**.

The transmission ratios of the various geared parts **94*a*, 94*b*, 94*d*, 94*e*, 94*g* and 94*h* are selected such that a longer path of actuation of the outer end 92*a*1 of the actuating lever 92*a* causes a shorter path of displacement of the control element 80 relative to the holding element 84**.

Additionally or alternatively, the shaft **94*f* is connected with a drive motor M which is supplied with the required driving energy through a suitable one (designated by L in FIGS. 15–18) of the supply lines 70*a*1–70*a*4 on the tractor side. The connection with a supply line on the tractor side entails the advantage that there is always available a practically unlimited amount of driving energy for the motor M. In case of the additional employment of a drive motor M, one must furthermore see to it that its function is not adversely affected by the self-locking of the gear 94**.

For connecting the multiple coupling halves 68*a* and 68*b* starting out from the uncoupled state shown in FIG. 15, the multiple coupling halves are moved towards each other until the pilot bars 61*a* (FIG. 13) engage the passages 61*b* and subsequently the control element 80 and the active mover element 82 are inserted into the recess 74*b*4 of the force engagement element 74*b* acting as passive mover element. The multiple coupling halves 68*a* and 68*b* are now in their coupling preparatory state shown in FIG. 16. By abutment of an axial terminal face 82*f* of the active mover element 82 against the annular flange 74*b*8, it is ensured that the radial bores 83*e* and thus the balls 90 are in this coupling preparatory state directly opposite to the annular groove 74*b*5.

Thereupon, the actuating lever 92*a* is pivoted in FIG. 16 in the direction of the arrow C whereby the control element 80 is moved by the transmission mechanism 94 in the direction A, i.e. in FIG. 16 to the left. Due to this movement, the conically enlarged section 80*a* of the control element 80 is introduced into the conical enlargement 82*g* of the longitudinal bore 82*d*, whereby the balls 90 are radially outwardly forced out of the radial bores 83*e* by the outer circumferential face of the conical section 80*a*, which outer circumferential face acts as control face. After a displacement of the control element 80 by a path $V_1$, the conically enlarged section 80*a* of the control element 80 abuts against the conical enlargement 82*g* of the longitudinal bore 82*d*. Meanwhile, the holding element 84 remains in its above-described resting position.

When in the position according to FIG. 17 the control element 80 is completely drawn into the active mover element 82, the balls 90 engage the annular groove 74*b*5 of the passive mover element 74*b* and establish by the abutment of the balls 90 against a first slope surface 74*b*6 of the annular groove 74*b*5 a form-locking motion transmitting engagement for the transmission of a tractive force from the force engagement element 74*a* to the force engagement element 74*b*. The multiple coupling halves 68*a* and 68*b* are in their motion transmitting engagement state.

On further swivelling of the actuating lever 92*a* in FIG. 17 in the direction of the arrow C, the control element 80 is further moved in the direction of the arrow A, i.e. in FIG. 17 to the left. With this movement, the control element 80 entrains on account of the abutment of the outer circumferential face of its conical section 80*a* against the inner circumferential face of the conical enlargement of the active mover element the active mover element 82 against the action of the spring 86. With this movement by the further path $V_2$, the force engagement elements 74*a* and 74*b* are contracted due to the motion transmission engagement via the ball 90 to establish the coupling position of the multiple coupling halves 68*a* and 68*b* shown in FIG. 18.

The path sections $V_1$ and $V_2$ together make the total displacement path $V_{tot}$ of the control element 80.

By the use of the worm gear 94*a* meshing with the gear wheel 94*b*, the transmission mechanism 94 is rendered self-locking so that the two multiple coupling halves 68*a* and 68*b* cannot be disengaged unintentionally from the coupled state. The self-locking may, however, also be realized in any other manner, e.g. by the use of cams.

Further, additional securing means 92*c*/84*c* are provided which are described in detail hereinafter by reference to FIG. 14. According to FIG. 14, a locking pin 92*c* guided in the actuating lever 92*a* engages due to the biasing force of a securing spring 92*d* a securing recess 84*c* formed in the holding element 84 when the actuating lever 92*a* has reached its position shown in FIG. 18. The locking pin 92*c*, the securing spring 92*d* and the securing recess 84*c* together form the additional securing means which guarantee in addition to the self-locking transmission mechanism 94 that the actuating lever 92*a* is secured against unintended swinging out of the position shown in FIG. 18.

Figure 18:
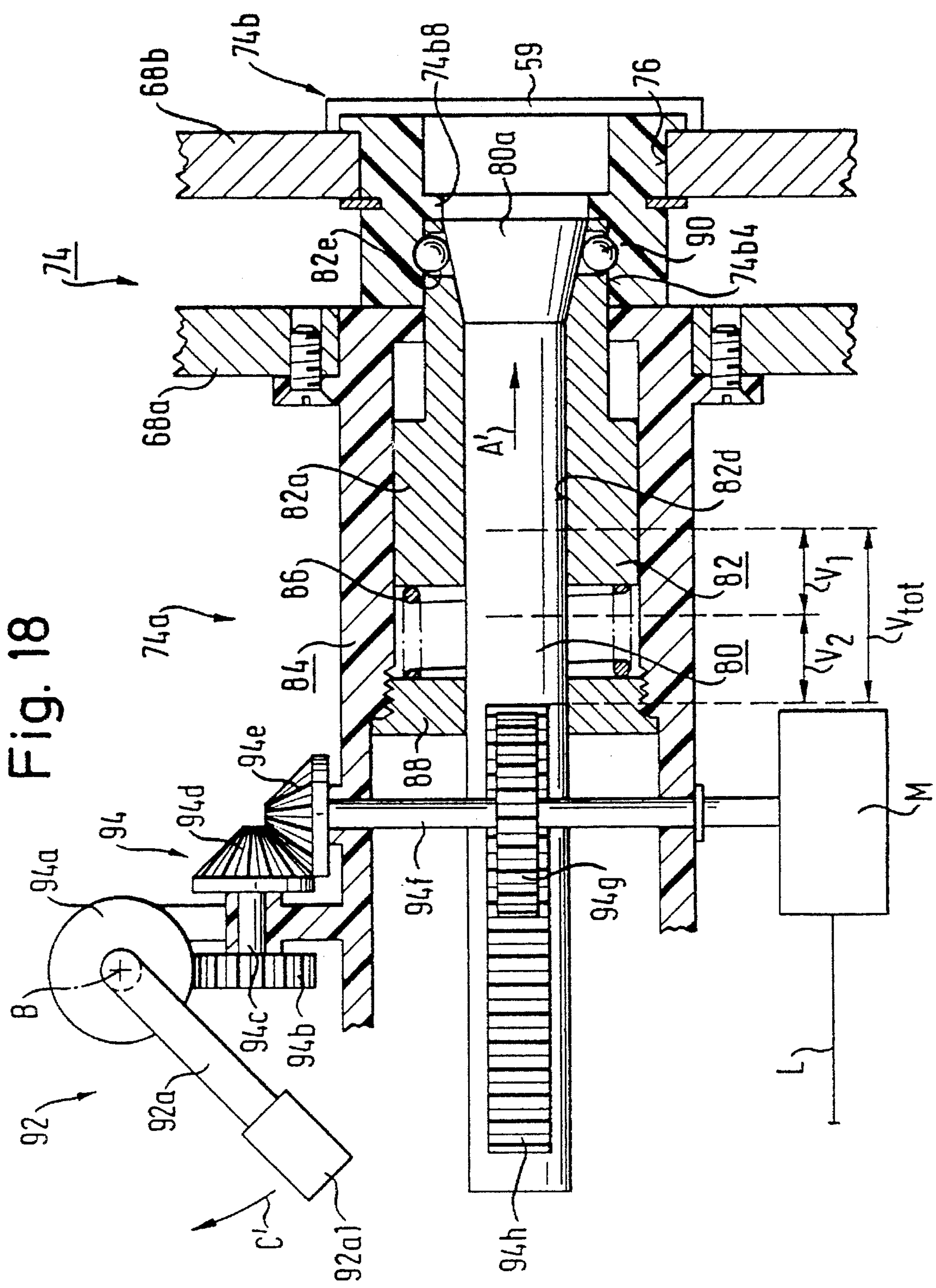

For uncoupling the multiple coupling halves 68*a* and 68*b* starting out from the secured coupled state according to FIGS. 18 and 14, the locking pin 92*c* is by means of a releasing pin 92*e* drawn out of the securing recess 84*c* against the force of the securing spring 92*d*. Then, the actuating lever 92*a* is pivoted in FIG. 18 in the direction of the arrow C' whereby the control element 80 is moved in the direction of the arrow A'. Thus, also the active mover element 82 is pressed to the right by the force of the spring 86. The spring 86 must be dimensioned such that the motion transmitting engagement between the force engagement elements 74*a* and 74*b* is always reliably maintained during this movement.

This motion transmitting engagement is on account of the abutment of the ball 90 against a second slope face 74*b*7 of the annular groove 74*b*5 a form-locking engagement for transmitting a pushing force onto the force engagement element 74*b*. Although the force engagement elements 74*a* and 74*b* are in form-locking motion transmitting engagement with each other for transmitting both a tractive force as well as a pushing force, it is likewise possible to provide for the one or for both cases a friction-contact motion transmitting engagement.

When the active mover element 82 has reached its resting position according to FIG. 17, on further swinging of the actuating lever 92 in FIG. 17 in the direction of the arrow C' the conical section 80*a* of the control element 80 is moved out of the conical enlargement of the longitudinal passage 82*d*. Thereby, the balls 90 can again withdraw into the radial bore 80*e*, so that the motion transmitting engagement of the force engagement elements 74*a* and 74*b* is cancelled and the multiple coupling halves 68*a* and 68*b* can again be transferred into the release position according to FIG. 15.

In FIG. 12 which is similar to FIGS. 10 and 11, a further possibility of connecting the multiple coupling halves to the respective partial vehicles 12 and 24 is shown in a schematic view wherein analogous parts are designated by the reference numerals of FIG. 6, however increased by the figure 600. The embodiment according to FIG. 12 will be described hereinafter only as far as it differs from the embodiment of FIG. 11. Otherwise, reference should be had to the description of the example embodiment according to FIG. 11.

The embodiment of FIG. 12 differs from the embodiment of FIG. 11 by the feature that the supply lines 670*a*1 to 670*a*4 directly connected to the central supply unit 667 are directly guided to the line coupling halves 672*a*1 to 672*a*3 by omission of individual quick-release connectors corresponding to the individual quick-release connectors 565*a*1 to 565*a*3.

The embodiment of FIG. 12 differs from the embodiment of FIG. 11 by the further feature that at the peripheral edge of the (dash-dotted) cover 696*a* sealing means 696*b*, e.g. a rubber packing washer, is provided which is schematically shown in FIG. 12 in the form of a triangle. On account of the prestress of the cover 696*a*, the sealing means 696*b* is pressed in the covering position of the cover 696*a* against the multiple coupling half 668*b*.

The stowage device 698 is provided with a part **698*a* which corresponds to the passive mover element, so that the multiple coupling half 668*a* on the tractor side can be fixed in a simple manner to this stowage device by means of the force engagement member 674*a*. This position is shown in FIG. 12 by dash-dotted lines. In this stowage position, a space R' defined by the coupling half 668*a* on the tractor side and the stowage device 698** is protected by the rubber sealing from atmospheric influences and from dirt.

Such a rubber sealing may also be provided in the embodiments according to FIGS. 10 and 11. Furthermore, it is to be noted for all the embodiments described hereinbefore that the operator carrying out the coupling of the two multiple coupling halves can make all necessary coupling works without any aid. Especially to be noted is that the stowage device 498 or 598 or 698, respectively, is arranged at the tractor vehicle in such a manner that it can be reached by the operator without any additional aid.

Instead of the cover **496*a* or 596*a* or 696*a* on the trailer side, one may want to provide a cover element which is provided with a blind plug simulating the active mover element. Such a cover element is e.g. shown in FIG. 19 wherein analogous parts are designated by the reference numerals of FIG. 6**, however increased by the figure 700.

The multiple coupling half **768*b* on the trailer side according to FIG. 19 is identical with that one of FIGS. 6 and 14 and comprises particularly a continuous peripheral edge 768*b*1. The cover element 796*a* includes a carrier plate 796*a*1 with a continuous peripheral edge 796*a*2 on which a sealing element 796*b*, e.g. a rubber packing washer, is provided. The cover element 796*a* is provided with a blind plug 796*a*3 associated with the force engagement member 774*b* on the trailer side. The blind plug 796*a*3 includes snap-in balls 796*a*4 which are radially outwardly biased by means of helical compression springs 796*a*5. The cover element 796*a* may be slipped onto the multiple coupling half 768*b* on the trailer side e.g. by means of a handle 796*a*6, whereby the blind plug 796*a*3 engages with its snap-in balls 796*a*4 the groove of the force engagement member 774*b***.

Further, it is to be noted that in all the aforementioned embodiments the coupling direction A is substantially parallel to the driving direction of the motor vehicle assembly.

Although the example embodiment in accordance with the above-described FIGS. 6 to 18 was equipped with a manually operated power device 74, it is conceivable in principle to use a power device actuated by an electric motor or pneumatically. Since the electric or compressed air lines required for this are conducted to the multiple coupling anyway, such change can be made without great effort.

The invention can be used basically and preferably in connection with semi-trailer trucks. However, it can also be used with other motor vehicle assemblies which are connected by means of conventional trailer hitches. Thus, the invention can be used with trucks and buses with trailers of conventional design, for example trailers having a front axle steered by a drawbar and at least one fixed rear axle, where the drawbar is connected via a coupling eyebolt to a bolt coupling in the rear end of the truck or bus. Another field of employment are transport trains consisting of a truck or other tractor vehicle with a conventional trailer hitch and a one-axle or tandem trailer which is connected via a rigid drawbar to the trailer hitch of the tractor vehicle.

The invention can basically also be used with motor vehicle assemblies consisting for example of a passenger car and a one-axle or tandem trailer connected with it. The invention can furthermore be employed with motor vehicle assemblies where the trailer vehicle is a mobile device, for example an agricultural implement or a construction device.

In accordance with the above, a conventional trailer is understood to be on the one hand a trailer having a drawbar on its front end, where this drawbar is provided with a coupling eyebolt for engagement with a trailer hitch of the tractor vehicle of the type in accordance with U.S. Pat. No. 4,577,885 and German Published, Examined Patent Application 1 095 132.

In one type of such conventional trailers the drawbar is embodied to be pivotable in respect to the trailer around a vertical axis and the front wheels of the trailer can be steered by means of the drawbar, while two or more wheels are disposed on rigid, non-steerable axles at the back end of the trailer. Another type of such conventional trailers has a drawbar which is rigidly connected with the trailer and one or more rigid and non-steerable axles disposed closely behind each other in the long direction of the trailer.

On the other hand, however, a conventional trailer is also understood to be a trailer which has on its front end a drawbar with a coupling socket for ball-and-socket engagement with a ball of a trailer hitch of the tractor vehicle.

Furthermore, it is to be noted that the moving device serves as a primary securing means for maintaining the coupled state between the coupling halves and maintains the sealing pressure for the compression sealing means.

What is claimed is:

1. A motor vehicle assembly, comprising two partial vehicles, namely a truck vehicle and a trailer vehicle, said trailer vehicle being connected with said truck vehicle by mechanical coupling means for joint drive, at least one supply line being provided between said truck vehicle and said trailer vehicle, said supply line having a supply line coupling, said supply line coupling having two coupling halves, said two coupling halves being—in a coupling direction—coupleable with each other towards a coupling state and being separable from each other, at least one moving means being provided in order to move said two coupling halves in a direction parallel to the coupling direction relative to each other, said moving means comprising an active mover element being connected with a first coupling half and being adjustable with respect to said first coupling half parallel to said coupling direction by drive means, a second coupling half being substantially immovably connected with a passive mover element, said active mover element being provided with active motion transmitting means, said passive mover element being provided with passive motion transmitting means, said active motion transmitting means being attached to said active mover element for a motion substantially transverse to the coupling direction and being adjustable by control means to be brought selectively into or out of engagement with said passive motion transmitting means.

2. The motor vehicle assembly of claim 1, wherein said first coupling half is connected with a control element which is adjustable with respect to said first coupling half parallel to said coupling direction along a control element path, said control element being adjustable in a first section of said control element path also with respect to said active mover element in order to adjust said active motion transmitting means with respect to said active mover element, said control element being connected with said active mover element in a second section of said control element path for common movement, and said control element being provided with drive means.

3. The motor vehicle assembly of claim 2, wherein said control element is guided in a passage of said active mover element, which passage extends parallel with respect to said coupling direction.

4. The motor vehicle assembly of claim 2, wherein said active motion transmitting means comprise at least one motion transmitting body which is movably guided transversely to said coupling direction in a transverse guide of said active mover element, a control surface inclined with respect to said coupling direction being formed on said control element, said control surface interacting with said at least one motion transmitting body, and said motion transmitting body being formed at a side remote from said control surface for engagement with said passive motion transmitting means of said passive mover element.

5. The motor vehicle assembly of claim 1, wherein said active motion transmitting means and said passive motion transmitting means are adapted at least for a movement of said second coupling element with respect to said first coupling element towards the establishment of a coupling state between said coupling halves.

6. The motor vehicle assembly of claim 1, wherein respective stop means are provided on said active and said passive mover elements, which stop means are suited for moving said second coupling element with respect to said first coupling element in an uncoupling sense.

7. The motor vehicle assembly of claim 2, wherein said drive means are located at a stationary place with respect to guide means which are connected with said first coupling half, said active mover element being guided in said guide means parallel to said coupling direction, said control element being guided in said active mover element parallel to said coupling direction, biasing means being provided for biasing said active mover element towards a resting position corresponding to the uncoupled state of the two coupling halves with respect to said guide means, said drive means being in driving engagement with said control element, and respective stop means being provided on said active mover element and on said control element, which stop means cause in the second path section of said control element path movement of said active mover element against the action of said biasing means by said control element.

8. The motor vehicle assembly of claim 1, wherein said drive means are self-locking drive means such that they are not displaceable by a force exerted onto said active mover element along said coupling direction.

9. The motor vehicle assembly of claim 1, wherein said drive means are provided with securing means securing the coupled state of the two coupling halves.

10. The motor vehicle assembly of claim 1, wherein said active mover element is provided on a first coupling half carrier which carries respective first coupling halves of a plurality of line couplings, and wherein said passive mover element is provided on a second coupling half carrier which carries respective second coupling halves of said plurality of line couplings.

11. The motor vehicle assembly of claim 1, wherein said first and said second coupling halves are associated with respective prepositioning means which are mutually engageable by an operator and which guide an approach movement of the two coupling halves in said coupling direction in a mutual orientation allowing the establishment of said coupling in response to said approach movement.

12. The motor vehicle assembly of claim 11, wherein said prepositioning means comprise at least one pair, preferably two pairs, of a pilot bar and a pilot bar passage.

13. The motor vehicle assembly of claim 1, wherein the two coupling halves of said at least one line coupling have coupling engagement faces which are enclosed in said coupling state in a shelter.

14. The motor vehicle assembly of claim 13, wherein said shelter houses respective coupling engagement faces of respective coupling halves of a plurality of line couplings.

15. The motor vehicle assembly of claim 13, wherein said shelter houses said motion transmitting means of said active and said passive mover elements.

16. The motor vehicle assembly of claim 13, wherein said shelter is defined by respective shelter limiting faces which are connected with the two coupling halves, at least one of said shelter limiting faces being provided with compression sealing means, said compression sealing means being sealingly activated in response to said two coupling halves of said at least one line coupling approaching said coupling state.

17. The motor vehicle assembly of claim 16, wherein said shelter limiting faces are formed by carrier plates to which first and second coupling halves of a plurality of line couplings and furthermore said active and said passive mover elements of said at least one moving means are attached.

18. The motor vehicle assembly of claim 1, wherein said drive means comprise a drive motor.

19. The motor vehicle assembly of claim 18, wherein said drive motor is mounted to one of said coupling halves connected with said truck vehicle.

20. The motor vehicle assembly of claim 1, wherein said drive means comprise a manually operated driving device.

21. The motor vehicle assembly of claim 20, wherein said manually operated driving device comprises a manually operated driving lever which is pivoted about a pivot axis extending substantially orthogonal with respect to said coupling direction.

22. The motor vehicle assembly of claim 1, wherein one of the two coupling halves is connected through a flexible line section with one of the two partial vehicles—truck vehicle and trailer vehicle—and the other coupling half is rigidly fixed to the respective other partial vehicle.

23. The motor vehicle assembly of claim 22, wherein said first coupling half is connected through said flexible line section with said truck vehicle and said second coupling half is substantially rigidly fixed to said trailer vehicle.

24. The motor vehicle assembly of claim 22, wherein the one coupling half connected with said flexible line section is attachable to an associated one of the two partial vehicles—truck vehicle and trailer vehicle—by means of a holding device when said one coupling half is separated from said other coupling half.

25. The motor vehicle assembly of claim 24, wherein said holding device includes a passive mover element so that said first coupling half is arrestable to said holding device with the aid of said moving means.

26. The motor vehicle assembly of claim 25, wherein a shelter limiting face of said first coupling half defines together with a shelter limiting face of said holding device a shelter when said first coupling half has been connected with said holding device.

27. The motor vehicle assembly of claim 1, wherein the second coupling half when being separated from said first coupling half is protectable from atmospheric influence by cover means.

28. The motor vehicle assembly of claim 27, wherein said cover means are provided with holding means which can be brought to holding engagement with coupling engagement faces of said second coupling half.

29. An over-the-road partial vehicle which is adapted to be releasably connected by releasable mechanical coupling means with an over-the-road joint partial vehicle selected from a plurality of joint partial vehicles to form a motor vehicle assembly, in which motor vehicle assembly the partial vehicle and the respective joint partial vehicle are connected to each other by a plurality of flexible supply lines fulfilling different supply functions, said partial vehicle being equipped a. with a group of line connecting halves on the partial vehicle side which are adapted to be connected quickly with and disconnected from a corresponding group of line connecting halves on the joint partial vehicle side in the course of operational assembling and disassembling, respectively, of the motor vehicle assembly by individual quick coupling and decoupling operations, respectively, to establish or interrupt, respectively, respective line connections, and b. with a set of line coupling halves on the partial vehicle side which are constructionally combined to form a multiple coupling half unit on the partial vehicle side such that they can be quickly coupled with and uncoupled from, respectively, a corresponding set of line coupling halves on the joint partial vehicle side which are constructionally combined to form a multiple coupling half unit on the joint partial vehicle side by a common quick coupling or decoupling operation to establish or interrupt a multiple coupling unit, and respective line connecting halves and line coupling halves on the partial vehicle side being allocated to respective identical supply functions, said group of line connecting halves and said multiple coupling half unit being disposed externally of the partial vehicle for easy access for an operational coupling to or decoupling from the joint partial vehicle.

30. The partial vehicle of claim 29, wherein at least one of said line coupling halves on the partial vehicle side is adapted to be permanently connected in parallel with the line connecting half on the partial vehicle side allocated to the same supply function through a respective supply line section permanently connected with the partial vehicle, both said group of line connecting halves and said multiple coupling half unit being selectively available for operational coupling of the partial vehicle with the selected joint partial vehicle.

31. The partial vehicle of claim 29, wherein at least one of said line coupling halves on the partial vehicle side is adapted to be releasably connected in parallel with the line connecting half on the partial vehicle side allocated to the same supply function through a supply line section permanently connected with the partial vehicle and an individual quick connection.

32. The partial vehicle of claim 29 wherein at least one of said line coupling halves on the partial vehicle side is adapted to be releasably connected in series with the line connecting half on the partial vehicle side allocated to the same supply function through a supply line releasably connectable with said line connecting half via an individual quick connection.

33. The partial vehicle of claim 29, wherein said multiple coupling half unit on the partial vehicle side is substantially rigidly fixed to the partial vehicle.

34. The partial vehicle of claim 33, wherein said multiple coupling half unit on the partial vehicle side is releasably fixed to a carrier of the partial vehicle.

35. The partial vehicle of claim 39, wherein at least one moving means is provided for coupling the multiple coupling half unit on the partial vehicle side with a multiple coupling half unit on provided on the selected joint partial vehicle to form a multiple coupling unit.

36. The partial vehicle of claim 33, wherein said partial vehicle is a trailer vehicle.

37. A motor vehicle assembly, comprising two partial vehicles, namely a truck vehicle and a trailer vehicle, said trailer vehicle being connected with said truck vehicle by mechanical coupling means for joint drive, a plurality of supply lines being provided between said truck vehicle and said trailer vehicle, each supply line having a supply line coupling, each supply line coupling having two coupling halves, said two coupling halves being—in a coupling direction—coupleable with each other towards a coupling state and being separable from each other, at least one moving means being provided in order to move said two coupling halves in a direction parallel to the coupling direction relative to each other, said moving means comprising an active mover element being connected with a first coupling half and being adjustable with respect to said first coupling half parallel to said coupling direction by drive means, a second coupling half being substantially immovably connected with a passive mover element, said active mover element being provided with active motion transmitting means, said passive mover element being provided with passive motion transmitting means, said active motion transmitting means being attached to said active mover element for a motion substantially transverse to the coupling direction and being adjustable by control means to be brought selectively into or out of engagement with said passive motion transmitting means, the two coupling halves of each of the plurality of line couplings having coupling engagement faces which are enclosed in said coupling state in a shelter common to all of the couplings of the plurality, and said shelter being defined by respective shelter limiting faces which are connected with the two coupling halves, at least one of said shelter limiting faces being provided with compression sealing means, said compression sealing means being sealingly activated in response to said two coupling halves of said plurality of line couplings approaching said coupling state.

* * * * *

UNITED STATES PATENT AND TRADEMARK OFFICE

CERTIFICATE OF CORRECTION

PATENT NO. : 5,458,357

DATED : October 17, 1995

INVENTOR(S) : Gerhard Wohlhüter

It is certified that error appears in the above-indentified patent and that said Letters Patent is hereby corrected as shown below:

Col. 4, line 34, "martial" should read --partial--;
Col. 6, line 60, "last" should read --least--;
Col. 14, line 48, "250c" should read --350c--;
Col. 17, line 22, "end" should read --and--;
Col. 17, line 48, "only" should read --only by--;
Col. 20, line 67, "e.e." should read --e.g.--;
Col. 21, line 66, "7868" should read --78b8--;
Col. 22, line 29, "83e" should read --82e--;
Col. 22, line 32, "83e" should read --82e--;
Col. 23, line 18, "83e" should read --82e--;
Col. 23, line 27, "83e" should read --82e--;
Col. 30, line 10, "claim 39" should read --claim 29--;
Col. 30, line 13, "on provided" should read --provided--.

Signed and Sealed this

Fifth Day of March, 1996

Attest:

BRUCE LEHMAN

*Attesting Officer* — *Commissioner of Patents and Trademarks*